(12) United States Patent
Barboy et al.

(10) Patent No.: US 10,929,568 B2
(45) Date of Patent: Feb. 23, 2021

(54) APPLICATION CONTROL

(71) Applicant: CyberArk Software Ltd., Petach-Tikva (IL)

(72) Inventors: Dmitry Barboy, Rishon-LeZion (IL); Andrey Dulkin, Herzlia (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 16/590,056

(22) Filed: Oct. 1, 2019

(65) Prior Publication Data

US 2020/0034558 A1    Jan. 30, 2020

Related U.S. Application Data

(63) Continuation of application No. 15/586,366, filed on May 4, 2017.

(Continued)

(51) Int. Cl.
*G06F 21/00* (2013.01)
*G06F 21/62* (2013.01)
(Continued)

(52) U.S. Cl.
CPC ............ *G06F 21/629* (2013.01); *G06F 21/44* (2013.01); *G06F 21/55* (2013.01); *G06F 21/6218* (2013.01)

(58) Field of Classification Search
CPC .... G06F 21/629; G06F 21/44; G06F 21/6218; G06F 21/55
See application file for complete search history.

(56) References Cited

U.S. PATENT DOCUMENTS 6,697,948 B1 * 2/2004 Rabin ................... G06F 21/10
                                                     705/52
9,369,429 B1 * 6/2016 Whittle ............... H04L 61/2596
(Continued)

FOREIGN PATENT DOCUMENTS

EP         2738709 A1    6/2017

OTHER PUBLICATIONS

Chow et al. "Controlling data in the cloud: outsourcing computation without outsourcing control", Proceedings of the 2009 ACM workshop on Cloud computing security, pp. 85-90, Nov. (Year: 2009).*
(Continued)

*Primary Examiner* — Morshed Mehedi
(74) *Attorney, Agent, or Firm* — Finnegan, Henderson, Farabow, Garrett & Dunner, LLP

(57) ABSTRACT

A method for controlling application operations on data elements includes identifying an activity by an instance of an application running on a host to perform an operation associated with a data element. The method further includes obtaining an application label which includes information regarding the instance of the application, and obtaining a data element label which includes information regarding the data element. Then, based on a combined analysis of the data element label and the application label, an operational policy governing the operation of the instance of the application with respect to the data element is determined. A control action is applied to the operation, according to the operational policy, so as to control the operation by the instance of the application with respect to the data element.

20 Claims, 8 Drawing Sheets

Related U.S. Application Data

(60) Provisional application No. 62/333,988, filed on May 10, 2016.

(51) Int. Cl.
    *G06F 21/55*     (2013.01)
    *G06F 21/44*     (2013.01)

(56) References Cited

U.S. PATENT DOCUMENTS

| | | |
|---|---|---|
| 10,009,868 B1 | 6/2018 | Reyes |
| 10,070,315 B2 * | 9/2018 | Joshi ............... H04W 12/08 |
| 2002/0188869 A1 | 12/2002 | Patrick |
| 2002/0199123 A1 * | 12/2002 | McIntyre ........... H04L 63/104 |
| | | 726/3 |
| 2004/0177060 A1 * | 9/2004 | Nixon ............. G06F 16/24561 |
| 2005/0091655 A1 * | 4/2005 | Probert ............. G06F 21/6218 |
| | | 719/315 |
| 2006/0130120 A1 * | 6/2006 | Brandyberry ...... H04N 7/17309 |
| | | 725/136 |
| 2008/0077994 A1 | 3/2008 | Comlekoglu |
| 2010/0024016 A1 * | 1/2010 | Violleau ............ G06F 21/335 |
| | | 726/7 |
| 2010/0043049 A1 | 2/2010 | Carter |
| 2013/0080507 A1 | 3/2013 | Ruhlen |
| 2013/0086587 A1 | 4/2013 | Naik |
| 2014/0007184 A1 * | 1/2014 | Porras ................ G06F 21/53 |
| | | 726/1 |
| 2014/0076475 A1 * | 3/2014 | Galicia .............. G06F 17/289 |
| | | 156/64 |
| 2014/0082350 A1 | 3/2014 | Zarfoss, III |
| 2015/0222646 A1 * | 8/2015 | Diehl ............... H04L 63/1441 |
| | | 726/23 |
| 2015/0227598 A1 | 8/2015 | Hahn |
| 2017/0300178 A1 * | 10/2017 | Blazek ............... H04L 67/02 |
| 2018/0091579 A1 * | 3/2018 | Thomas .............. H04L 67/02 |

OTHER PUBLICATIONS

European Examination Report for corresponding EP Application No. 17169599.2 dated Oct. 29, 2018.

\* cited by examiner

APPLICATION CONTROL

RELATED APPLICATIONS

This application is a continuation of U.S. patent application Ser. No. 15/586,366, filed on May 4, 2017 (currently pending), which claims the benefit of priority under 35 USC § 119(e) of U.S. Provisional Patent Application No. 62/333,988 filed on May 10, 2016. The disclosures of the above-referenced applications are expressly incorporated herein by reference in their entirety.

FIELD AND BACKGROUND OF THE INVENTION

The present invention, in some embodiments thereof, relates to controlling operations on data elements and, more particularly, but not exclusively, to policy-based control of operations on data elements.

Controlling access to data is a major concern of the field of cyber-security. Unauthorized access to data and/or unauthorized operations on data may cause significant harm to an organization, such as dissemination of the data outside the organization.

Many approaches have been developed to protect data against unauthorized access from both inside and outside the organization. For example, firewalls are used to control external access to the local network. Data may be encrypted so that even if an intruder accesses a data file, it will not be able to read the data in the file.

In another approach, privileged account management (PAM) systems are used to control access to applications and data by privileged accounts, by mechanisms such as credential management and access policies. The access policy may specify data access permissions for a given account, user or group of users. Additionally, a user may be required to provide credentials (such as a password or secret) in order to access the data.

SUMMARY OF THE INVENTION

Embodiments presented herein use an operational policy to control the operations performed by an instance or instances of an application with respect to data elements. The operational policy includes control measures and/or control actions (e.g. protective measures) to be applied to operations performed by the application instance with respect to the data element.

The operational policy is determined by analyzing an application label and a data element label in combination. The application label provides information about the application instance. The application label may include information such as uses of the application instance, characteristics of the application instance, metadata associated with the application instance and so forth. The data element label contains information about data element, such as use of the data element, characteristics of the data element and operations performed on the data element.

In optional embodiments, the operational policy is additionally based on information regarding multiple application instances and/or on information regarding multiple data elements (typically data elements with some common association with a specific data element). The information regarding the additional application instances and/or data elements may be provided by multiple labels or using labels with aggregated information, as described in more detail below.

As used herein the term "application" means the series of commands (for example contained in an executable file, script or other) that upon execution will create an application instance and/or the execution instance itself. Types of applications include scripts, binaries, loadable modules, services, drivers etc.

As used herein, the term "instance of an application" (also denoted herein "application instance" or "instance") means a series of commands that are actually executed (i.e. running) on the host, usually mapped to machine memory, represented by a process and/or execution thread and processed by the processor.

As used herein, the term "data element" means data which is accessible to the application instance when permitted by the operational policy. Examples of data elements include data accessible in local storage, on a data server, in the Cloud, etc.

According to an aspect of some embodiments of the present invention there is provided a method for controlling application operations on data elements. The method includes executing program instructions by at least one hardware processor to:

identify an activity by an instance of an application running on a host to perform an operation associated with a data element;

obtain an application label which includes information regarding the instance of the application; obtain a data element label which includes information regarding the data element;

determine an operational policy based on a combined analysis of at least the application label and the data element label, the operational policy governing the operation of the instance of the application with respect to the data element; and apply a control action to the operation according to the operational policy, so as to control the operation by the instance of the application with respect to the data element.

According to some embodiments of the invention, identifying the activity by the instance of the running application includes intercepting an attempt by the instance of the application to access the data element.

According to some embodiments of the invention, obtaining an application label includes:

communicating with a resource associated with the application instance; receiving information about the application instance from the resource; and defining the application label based on the received information.

According to some embodiments of the invention, applying the control action includes restricting an ability of the instance of the application to perform the operation on the data element.

According to some embodiments of the invention, applying the control action includes controlling access by the instance of the application to the data element.

According to some embodiments of the invention, applying the control action includes dynamically monitoring operations performed by the instance of the application on the data element to identify violations of the operational policy.

According to some embodiments of the invention, applying the control action includes collecting audit data for operations performed by the instance of the application on the data element.

According to some embodiments of the invention, applying the control action includes at least one of:

isolating the host from accessing a network; and isolating the host from being accessible over a network.

According to some embodiments of the invention, applying the control action includes triggering an alert.

According to some embodiments of the invention, applying the control action includes controlling an operation of at least one other instance of the application with respect to the data element according to the operational policy.

According to some embodiments of the invention, the operation is at least one of: execute, write, read, modify, create and delete.

According to some embodiments of the invention, the method further includes controlling subsequent operations by the instance of the application according to the operational policy.

According to some embodiments of the invention, the method further includes dynamically updating at least one of the data element label and the application label.

According to some embodiments of the invention, the method further includes labeling at least one other data element created by the instance of the application.

According to some embodiments of the invention, the method further includes: upon determining that credentials are required for performing the operation, obtaining, based on the operational policy, corresponding credentials for performing the operation; and providing the corresponding credentials to the instance of the application.

According to some embodiments of the invention, the data element label includes an aggregation of information regarding a plurality of data elements.

According to some embodiments of the invention, the application label includes an aggregation of at least one of: information regarding a plurality of applications and information regarding a plurality of instances of the application.

According to some embodiments of the invention, obtaining the application label is performed before obtaining the data element label.

According to some embodiments of the invention, obtaining the application label is performed simultaneously with obtaining the data element label.

According to an aspect of some embodiments of the present invention there is provided a system configured for controlling application operations on data elements.

The system includes at least one non-transitory computer readable storage medium storing instructions and at least one processor. The at least one processor is configured to execute the instructions to:

identify an activity by an instance of an application running on a host to perform an operation associated with a data element;

obtain an application label which includes information regarding the application; obtain a data element label which includes information regarding the data element;

determine, based on a combined analysis of at least the data element label and the application label, an operational policy governing the operation of the instance of the application with respect to the data clement; and apply, according to the operational policy, a control action to the operation, so as to control the operation by the instance of the application on the data element.

According to some embodiments of the invention, the at least one processor is further configured to execute instructions to dynamically update at least one of the data element label and the application label.

According to some embodiments of the invention, the at least one processor is further configured to execute instructions to label other data elements associated with the application.

According to some embodiments of the invention, the system resides on one of:
the host;
an endpoint machine;
a plurality of endpoint machines;
a local server accessible via a local network;
a remote server accessible via an external network;
at least one cloud-based asset.

According to some embodiments of the invention, the data element resides in one of:
a local memory of the host;
a local storage unit accessible via a local network; and
a remote storage unit accessible via a remote network.

According to some embodiments of the invention, the at least one processor is further configured to execute instructions to: upon determining that credentials are required for performing the operation, obtain, based on the operational policy, corresponding credentials for performing the operation; and provide the corresponding credentials to the instance of the application.

According to some embodiments of the invention, the data element label includes an aggregation of information regarding a plurality of data elements.

According to some embodiments of the invention, the application label includes an aggregation of information regarding a plurality of applications.

According to some embodiments of the invention, the at least one processor is further configured to execute instructions to control at least one of: subsequent operations of the instance of the application and operations of at least one other instance of the application according to the operational policy, according to the operational policy.

According to an aspect of some embodiments of the present invention there is provided a non-transitory computer readable medium including instructions. When executed by at least one processor the instructions cause the at least one processor to perform operations for controlling application operations on data elements. The operations include:

identifying an activity by an instance of an application running on a host to perform an operation associated with a data element;

obtaining an application label which includes information regarding the application;

obtaining a data element label which includes information regarding the data element;

determining, based on a combined analysis of at least the data element label and the application label, an operational policy governing the operation of the instance of the application with respect to the data element; and applying, according to the operational policy, a control action to the operation, so as to control the operation by the instance of the application on the data element.

According to some embodiments of the invention, the non-transitory computer readable medium further includes instructions to dynamically update at least one of the data element label and the application label.

According to some embodiments of the invention, the non-transitory computer readable medium further includes instructions to label other data elements associated with the application.

According to some embodiments of the invention, the at least one processor resides on one of:
the host;
an endpoint machine;
a plurality of endpoint machines;

a local server accessible via a local network;
a remote server accessible via an external network;
at least one cloud-based asset.

According to some embodiments of the invention, the data element resides in one of:
a local memory of the host;
a local storage unit accessible via a local network; and
a remote storage unit accessible via a remote network.

According to some embodiments of the invention, the non-transitory computer readable medium further includes instructions to: upon determining that credentials are required for performing the operation, obtain, based on the operational policy, corresponding credentials for performing the operation; and
provide the corresponding credentials to the instance of the application.

According to some embodiments of the invention, the data element label includes an aggregation of information regarding a plurality of data elements.

According to some embodiments of the invention, the application label includes an aggregation of information regarding a plurality of applications.

According to some embodiments of the invention, the non-transitory computer readable medium further includes instructions to control at least one of: subsequent operations of the instance of the application and operations of at least one other instance of the application according to the operational policy.

According to an aspect of some embodiments of the present invention there is provided a method for controlling untrusted applications in a system environment. The method includes executing program instructions by at least one hardware processor to:
identify an activity by an instance of an application running on a host to perform an operation associated with a server;
obtain an application label which includes information regarding the instance of the application;
determine an operational policy based a combined analysis of at least the application label and information pertaining to the server, the operational policy governing the use and operation of the instance of the application with respect to the server; and
apply a control action to the operation according to the operational policy, so as to control the operation by the instance of the application with respect to the server.

According to some embodiments of the invention, identifying the activity by the instance of the running application includes intercepting an attempt by the instance of the running application to access the server.

According to some embodiments of the invention, obtaining an application label includes:
communicating with a resource associated with the application instance;
receiving information about the application instance from the resource; and
defining the application label based on the received information.

According to some embodiments of the invention, applying the control action includes restricting an ability of the instance of the application to perform the operation on the server.

According to some embodiments of the invention, applying the control action includes controlling communication between the instance of the application and the server.

According to some embodiments of the invention, applying the control action includes dynamically monitoring operations performed by the instance of the application with respect to the server to identify violations of the operational policy.

According to some embodiments of the invention, applying the control action includes collecting audit data for operations performed by the instance of the application with respect to the server.

According to some embodiments of the invention, the information pertaining to the server includes at least one of:
an Internet Protocol (IP) address associated with the server;
a Uniform Resource Locator (URL) address associated with the server;
a port associated with the server;
a host name associated with the server; and
a communication protocol associated with the server.

According to some embodiments of the invention, the method further includes dynamically updating at least one of the information pertaining to the server and the application label.

According to some embodiments of the invention, the method further includes:
upon determining that credentials are required for performing the operation, obtaining, based on the operational policy, corresponding credentials for performing the operation; and
providing the corresponding credentials to the instance of the application.

According to some embodiments of the invention, the application label includes an aggregation of at least one of: information regarding a plurality of applications, and information regarding a plurality of instances of the application.

According to some embodiments of the invention, the method further includes creating a server label which includes at least some of the information pertaining to the server, and wherein the determining an operational policy includes a combined analysis of at least the application label and the server label.

According to an aspect of some embodiments of the present invention there is provided a system configured for controlling untrusted applications in a system environment. The system includes at least one non-transitory computer readable storage medium storing instructions and at least one processor. The at least one processor is configured to execute the instructions to:
identify an activity by an instance of an application running on a host to perform an operation associated with a server;
obtain an application label which includes information regarding the instance of the application;
determine an operational policy based a combined analysis of at least the application label and information pertaining to the server, the operational policy governing the operation of the instance of the application with respect to the server; and
apply a control action to the operation according to the operational policy, so as to control the operation by the instance of the application with respect to the server.

According to some embodiments of the invention, the at least one processor is further configured to execute instructions to dynamically update at least one of the information pertaining to the server and the application label.

According to some embodiments of the invention, the at least one processor is further configured to execute instructions to:

upon determining that credentials are required for performing the operation, obtain, based on the operational policy, corresponding credentials for performing the operation; and provide the corresponding credentials to the instance of the application.

According to some embodiments of the invention, the application label includes an aggregation of at least one of: information regarding a plurality of applications, and information regarding a plurality of instances of the application.

According to some embodiments of the invention, the at least one processor is further configured to execute instructions to control at least one of: subsequent operations of the instance of the application and operations of at least one other instance of the application according to the operational policy, according to the operational policy.

According to an aspect of some embodiments of the present invention there is provided a non-transitory computer readable medium including instructions. When executed by at least one processor the instructions cause the at least one processor to control untrusted applications in a system environment by:

identifying an activity by an instance of an application running on a host to perform an operation associated with a server;

obtaining an application label which includes information regarding the instance of the application;

determining an operational policy based a combined analysis of at least the application label and information pertaining to the server, the operational policy governing the operation of the instance of the application with respect to the server; and applying a control action to the operation according to the operational policy, so as to control the operation by the instance of the application with respect to the server.

According to some embodiments of the invention, the non-transitory computer readable medium further includes instructions to dynamically update at least one of the information pertaining to the server and the application label.

According to some embodiments of the invention, the non-transitory computer readable medium further includes instructions to:

upon determining that credentials are required for performing the operation, obtain, based on the operational policy, corresponding credentials for performing the operation; and provide the corresponding credentials to the instance of the application.

According to some embodiments of the invention, the application label includes an aggregation of at least one of: information regarding a plurality of applications, and information regarding a plurality of instances of the application.

According to some embodiments of the invention, the non-transitory computer readable medium further includes instructions to control at least one of: subsequent operations of the instance of the application and operations of at least one other instance of the application according to the operational policy, according to the operational policy.

According to an aspect of some embodiments of the present invention there is provided a method for controlling application operations on data elements. The method is performed by at least one processor of an endpoint machine configured to run applications and includes:

identifying an attempt by an application running on the endpoint machine to perform an operation on a data element;

obtaining a data element label associated with the application, the data element label including information regarding the application;

obtaining an application label associated with the application element, the application label including information regarding the application;

determining, based on the data element label and the application label, an operational policy specifying operation permissions of the application with respect to the data element; and applying, according to the operational policy, a control action to the operation to control the operation by the application on the data element.

According to some embodiments of the invention, applying a control action includes at least one of:

permitting the application to perform the operation on the data element; restricting an ability of the application to perform the operation on the data element;

permitting the operation;

denying the operation;

controlling access by the application to the data element;

collecting audit data for operations performed by the application on the data element;

dynamically monitoring operations performed by the application on the data element to identify violations of the operational policy;

isolating the endpoint machine from accessing a network;

isolating the endpoint machine from being accessible over a network; and triggering an alert.

According to some embodiments of the invention, the operation is at least one of: execute, write, read, modify, create and delete.

According to some embodiments of the invention, the method further includes controlling subsequent operations by the application according to the operational policy.

According to some embodiments of the invention, the application label includes at least one of:

a source of the application;

previous operations performed by the application;

previous sessions of the application;

data elements previously used by the application;

identification of a user permitted to use the application;

identification of a group permitted to use the application;

accounts associated with users of the application;

accounts associated with the application; and a communication protocol associated with the application.

According to some embodiments of the invention, the data element label includes at least one of:

a source of the data element;

a creator of the data element;

an account associated with the data element;

an account that accessed the data element;

a time a previous operation was performed on the data element;

a type of the data element;

a group including the data element;

an application associated with the data element; and a communication protocol associated with said data element.

According to some embodiments of the invention, the method further includes dynamically updating at least one of the data element label and the application label.

According to some embodiments of the invention, the method further includes labeling at least one other data element created by the application.

According to some embodiments of the invention, the method further includes labeling at least one other data element identified by the application.

According to some embodiments of the invention, the determining includes reading a local policy file on the endpoint machine.

According to some embodiments of the invention, the determining includes reading a policy from a network resource accessible from the endpoint machine.

According to some embodiments of the invention, the determining is for an instance of the application with respect to the data element.

According to some embodiments of the invention, the method further includes: upon identifying that credentials are required for performing the operation, obtaining, based on the operational policy, corresponding credentials for performing the operation; and providing the corresponding credentials to the application.

According to some embodiments of the invention, the obtaining an application label is for an instance of the application.

According to some embodiments of the invention, the data element label is an aggregation of information regarding a plurality of data elements.

According to some embodiments of the invention, the application label is an aggregation of information regarding a plurality of applications.

According to some embodiments of the invention, the obtaining of the application label is performed before the obtaining of the data element label.

According to some embodiments of the invention, the obtaining of the application label is performed simultaneously with the obtaining of the data element label.

According to an aspect of some embodiments of the present invention there is provided a system configured for controlling application operations on data elements.

The system includes at least one non-transitory computer readable storage medium storing instructions and at least one processor. The at least one processor is configured to execute the instructions to:

identify an attempt by an application running on an endpoint machine to perform an operation on a data element;

obtain an application label associated with the application, the application label including information regarding the application;

obtain a data element label associated with the data element, the data element label including information regarding the data element;

determine, based on the data element label and the application label, an operational policy specifying operation permissions of the application with respect to the data element; and apply, according to the operational policy, a control action to the operation to control the operation by the application on the data element.

According to some embodiments of the invention, the applying a control action includes at least one of:

permitting the application to perform the operation on the data element;

restricting an ability of the application to perform the operation on the data element;

permitting the operation;

denying the operation;

controlling access by the application to the data element;

collecting audit data for operations performed by the application on the data element;

monitoring operations performed by the application on the data element in real-time to identify violations of the operational policy;

isolating the endpoint machine from accessing a network;

isolating the endpoint machine from being accessible over a network; and triggering an alert.

According to some embodiments of the invention, the at least one processor is further configured to execute instructions to dynamically update at least one of the data element label and the application label.

According to some embodiments of the invention, the at least one processor is further configured to execute instructions to label other data elements created by the application.

According to some embodiments of the invention, the at least one processor is further configured to execute instructions to label other data elements identified by the application.

According to some embodiments of the invention, the system resides on the endpoint machine.

According to some embodiments of the invention, the data element resides in a local memory of the endpoint machine.

According to some embodiments of the invention, the data element resides in a local storage unit accessible via a local network.

According to some embodiments of the invention, the data element resides in a remote storage unit accessible via a remote network.

According to an aspect of some embodiments of the present invention there is provided a non-transitory computer readable medium including instructions that, when executed by at least one processor, cause the at least one processor to perform operations for controlling application operations on data elements. The operations include:

identifying an attempt by an application running on the endpoint machine to perform an operation on a data element;

obtaining a data element label associated with the application, the data element label including information regarding the application;

obtaining an application label associated with the application element, the application label including information regarding the application;

determining, based on the data element label and the application label, an operational policy specifying operation permissions of the application with respect to the data element; and applying, according to the operational policy, a control action to the operation to control the operation by the application on the data element.

According to some embodiments of the invention, the instructions, when executed by at least one processor, cause the at least one processor to perform a further operation includes: controlling subsequent operations by the application according to the operational policy.

According to some embodiments of the invention, the instructions, when executed by at least one processor, cause the at least one processor to perform a further operation includes: dynamically updating at least one of the data element label and the application label.

According to some embodiments of the invention, the determining includes at least one of reading a local policy file on the endpoint machine and reading a policy from a network resource accessible from the endpoint machine.

According to some embodiments of the invention, the instructions, when executed by at least one processor, cause the at least one processor to perform further operations which include:

upon identifying that credentials are required for performing the operation, obtaining, based on the operational policy, corresponding credentials for performing the operation; and providing the corresponding credentials to the application.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
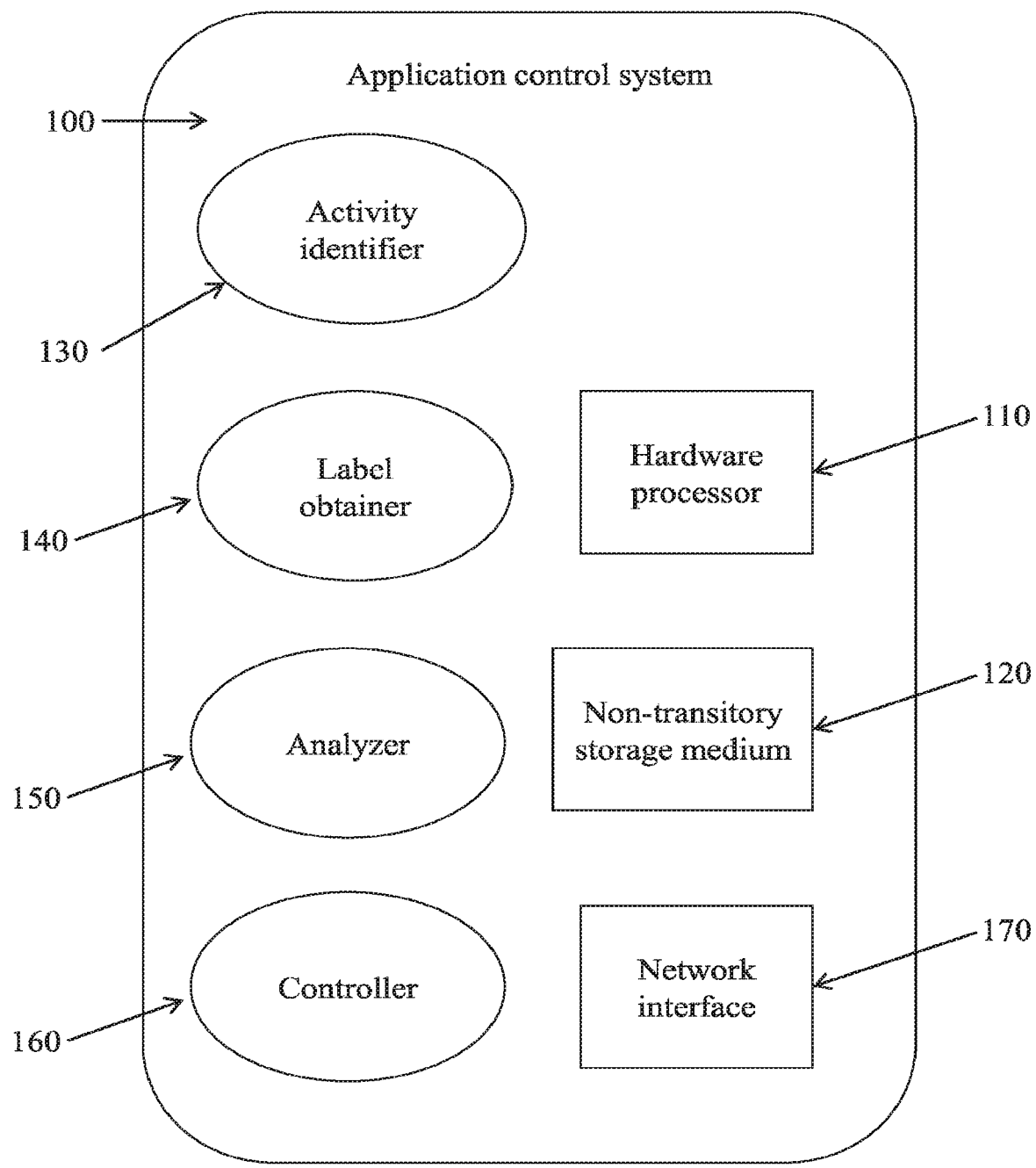
FIG. 1 is a simplified block diagram of an application control system, according to embodiments of the invention.

The present invention, in some embodiments thereof, relates to controlling operations on data elements and, more particularly, but not exclusively, to policy-based control of operations on data elements.

Embodiments presented herein use an operational policy to control operations performed by an instance or instances of an application with respect to data or data elements. The operational policy applied to the operations is determined from a combined analysis of an application label containing information regarding the application instance(s) and a data label containing information about the data element(s). The operational policy may specify control measures and/or control actions (e.g. protective measures) to be applied with respect to the data element(s).

Embodiments of the invention provide benefits including:

i) The operational policy may be selected and/or built for a specific combination of application instance(s) and data element(s).

ii) Different operational policies may be applied to different instances of the same application, even when those instances perform the same activity on the same data element.

iii) Embodiments of the invention may be implemented in a manner that is completely transparent to a user and/or automated tool on the endpoint.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified block diagram of an application control system in accordance with embodiments of the invention. FIG. 1 illustrates a centralized embodiment of application control system 100, in which all activities are performed by a single server or machine. In other embodiments, the functionality of the application control system is distributed over multiple machines.

Optionally, application control system 100 includes at least one hardware processor 110 which runs code stored on non-transitory storage medium 120, thereby causing the processor to perform application control as described herein.

For clarity, FIG. 1 describes application control system as formed from interacting components (e.g. label obtainer, analyzer, etc.), each performing respective functions. These components may be implemented by any means known in the art (e.g. as a process, script, module, etc.).

Activity Identifier

Activity identifier 130 identifies activities by an instance of an application to perform or attempt to perform an operation on a specific data element or elements. Optionally, a notification of the activity is received by application control system 100 from one or more of:

a) The host running the application instance;

b) The machine storing the data element; and c) A sniffer or other component monitoring network activity.

Activity identifier 130 monitors the application instance. Data obtained via this monitoring may be used for purposes such as identifying activities by the instance of the application in real time, auditing application instance activities and operations, analyzing application instance activities and operations, etc.

Examples of operations which may be performed by an instance of an application on data element(s) include but are not limited to:

1) Reading the data element;
2) Modifying to the data element;
3) Deleting the data element;
4) Moving the data element to a different location in the memory;
5) Transferring the data element to a different memory device (e.g. data server);
6) Sending the data element over a network.

Optionally, activities by the application instance which may be identified by activity identifier 130 include but are not limited to:

1) Requesting access to the data element;
2) Requesting access to the machine storing the data element;
3) Attempting to read/modify/delete/move the data element;
4) Using credentials (or a secret) to connect to the machine storing the data elements;
5) Requesting credentials (or a secret) to connect to the machine storing the data elements and/or to access the data elements.

In some cases when the application instance starts it is not known which data element(s) will be accessed by the application. Optionally, the application instance is monitored and attempts by the application instance to access the data element (e.g. file, folder, registry, internet, intranet server, share, etc.) are intercepted. After interception, the data element being accessed by the application instance is known. Further optionally, intercepting the attempt triggers obtaining the data element label for the data element being accessed.

Label Obtainer

Label obtainer 140 obtains the application label (also denoted an application tag) associated with the application instance and the data element label (also denoted a data element tag) associated with the data element.

Optionally, label obtainer 140 obtains the application label by communicating with a resource associated with the application instance and receiving the application label in reply. Alternately or additionally, label obtainer 140 receives information about the application instance from the resource associated with the application instance, and creates and/or updates the application label based on the received information about the application instance. Alternately or additionally, the resource associated with the application instance pushes the application label to application control system 100 (e.g. when the application instance is created).

The resource may be any system and/or network element associated with the application instance (e.g. accessible over a local or remote network, locally, on the host, etc.) which is capable of providing the label and/or some or all of the information required by label obtainer 140 in order to create and/or update the application label.

Optionally, label obtainer 140 obtains the data element label by querying a resource associated with the data element and receiving the data element label in reply. Alternately or additionally, label obtainer 140 receives information about the data element from the resource associated with the data element, and creates and/or updates the data element label based on the received information. Alternately or additionally, the resource associated with the data element pushes the data element label to application control system 100 (e.g. when the data element is created or modified).

The resource may be any system and/or element associated with the data element (e.g. accessible over a local or remote network, locally, on the machine storing the data element, etc.) which is capable of providing the label and/or some or all of the information required by label obtainer 140 in order to create and/or update the application label. Alternately or additionally, the resource associated with the data element pushes the data element label to application control system 100.

The application label includes information about the specific application instance, and optionally additionally includes information about associated application instances. Optionally, the application label includes parameters used for the application instance and/or metadata about the application instance. Information which may be included in the application label includes but is not limited to:

a source of the application instance;
previous operations performed by the application instance;
data elements previously used by the application instance;
accounts associated with users of the application instance;
accounts associated with the application instance;
a creator of the application instance;
operations performed by the application;
previous sessions of the application;
data elements previously used by the application;
identification of a user permitted to use the application;
identification of a group permitted to use the application;
accounts associated with users of the application;
accounts associated with the application; and
a communication protocol associated with the application (e.g. a protocol which facilitates operations performed by the application).

Optionally, the application label is dynamically updated.

The data element label includes information about a specific data element, and optionally also includes information about associated data elements. Information which may be included in the data element label includes but is not limited to:

Optionally, the data element label includes one or more of:

a source of the data element;
the location of the data element;
an account associated with the data element;
an account that accessed the data element;
a time a previous operation was performed on the data element;
a type of the data element;
a group including the data element;
an application type associated with the data element; and
a communication protocol associated with the data element (e.g. a protocol which facilitates the communication and transfer of data elements).

Optionally, the data element label is dynamically updated (e.g. to include information about new data elements that are identified by the application instance and/or that arc created by the application instance).

Optionally, data elements associated with (e.g. created by) the application instance are labeled with respective data labels.

Optionally, data elements identified by the application instance are labeled with respective data labels.

Analyzer

Analyzer 150 analyzes the application label and data element label in combination in order to determine an operational policy. The operational policy governs the operation of the application instance with respect to the data element(s). As used herein, the term "operation of the application instance with respect to the data element(s)" includes operations performed by the application instance on and/or using the data element(s), and/or the use of the application instance with respect to the data element(s).

Optionally, the operational policy sets limitations on how the application instance and/or data element may be used, for example:

a. Boundary enforcement (e.g. prevent files from the Internet from being copied to network file shares and/or prevent files from the internal network from being accessed by a web browser); and b. Permission enforcement (e.g. prevent non-admin users from changing applications or data elements).

Controller

Controller 160 applies a control action (or actions) to control the operation performed by the application instance on the data element, so that operations associated with the data element are consistent with the operational policy.

Since the operational policy is associated with a specific combination of application instance and data element, the operational policy applied to operations on the same data element(s) may be different for each application instance. Thus operational policies may allow operations by one application instance on a specific data element but deny operations on the same data element by a different application instance. For example, the operational policy allows an application instance running on a host within an organization to edit a given document whereas an application instance running on a host outside the organization is only be allowed to view the document. In another example, the operational policy specifies different types of access to sensitive resources and to public resources (e.g. an Internet Explorer instance connected to a sensitive corporate Intranet Server will be isolated from a different Internet Explorer instance which is connected to the public Internet).

Optionally, operational policies are stored internally in the application control system. Alternately or additionally, operational policies are obtained by the application control system from an external policy manager or repository.

In order to ease management, operational policies may be defined more broadly than for a specific application or data element, so that a single policy may be used to manage of groups of applications (such as "all Microsoft Office applications") and/or groups of data elements (such as "all data from the Internet").

Optionally, the operational policy takes into account the label history (for application labels and/or data element labels), where the term history means a combination of labels of previous operations.

Optionally, the applied control action includes at least one of:

permitting the application to perform the operation on the data element;

restricting an ability of the application to perform the operation on the data element;

permitting the operation;

denying the operation;

controlling access by the application to the data element;

collecting audit data for operations performed by the application on the data element;

monitoring operations performed by the application on the data element in real-time to identify violations of the operational policy;

isolating the host from accessing a network;

isolating the host from being accessible over a network;

denying the application instance from using credentials;

issuing and/or providing credentials enabling the operation to the application instance; and triggering an alert.

Optionally, the access control system controls subsequent operations by the application according to the operational policy.

The control action may be performed by any means known in the art. For example, control actions that involve isolating the host may be implemented by a driver on the host machine and/or by applying a firewall configuration which blocks network access by the host.

Network Interface

Optionally, application control system 100 includes network interface 170 for communicating over a network. Network interface 170 may be used to communicate with one or more of:

a) Host computers running applications;

b) Data servers (or other machine storing data elements);

c) Label database maintaining data element labels and/or application labels; and d) Account management system managing account privileges and/or credentials.

Figure 2:
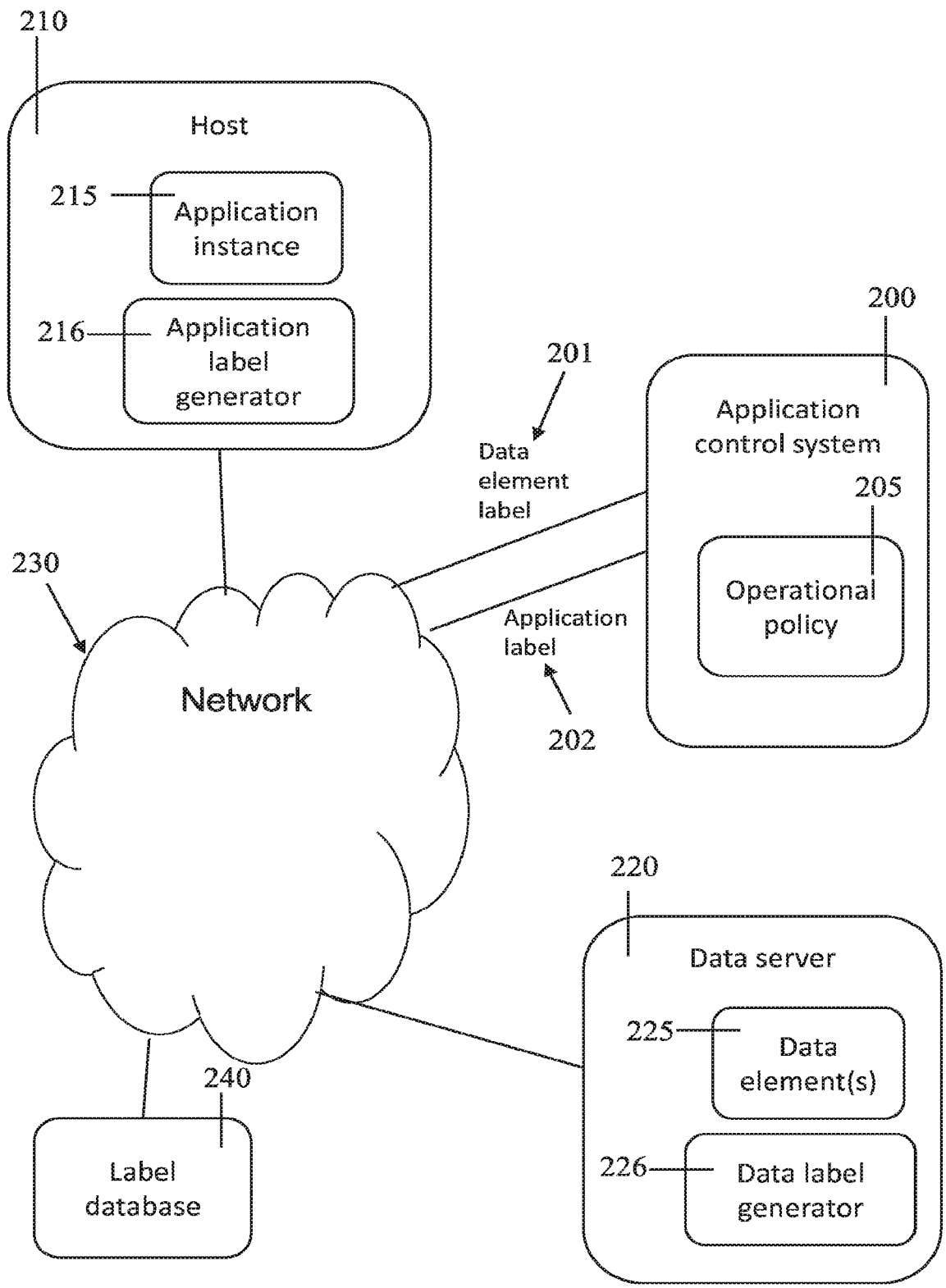
FIG. 2 is a simplified network diagram illustrating a configuration of the application control system in a network, according to embodiments of the invention.

Reference is now made to FIG. 2, which is a simplified network diagram of an application control system in network communication with a host and data server, according to embodiments of the invention. In the non-limiting embodiment of FIG. 2, application control system 200, host 210 and data server 220 reside on separate machines and communicate over network 230. Other exemplary configurations are illustrated in FIGS. 3-6.

Host 210 is the machine which runs application instance 215. Optionally, a single host runs multiple instances of the same application. For example, the file "notepad.exe" may be run multiple times on a Windows machine; that is multiple processes are created, each providing a separate instance. Additionally or alternately, different instances of the same application may run on different respective hosts. Each instance of the application may run with different respective parameters. For example some instances may be executed at a different time than other instances, run under a different account, perform different operations etc.

Optionally, host 210 also runs application label generator 216, which maintains respective labels for application instances, as required. For example, application label generator 216 may generate a respective application label 202 when the application instance is created. Alternately, application label generator 216 may generate the application label 202 when prompted by application control system 200.

Data server 220 stores data element(s) 225. The data element may be:

i) Locally available data, for example residing in a local memory or storage located on-premises, or associated with on-premises software installed and run on local resources or computers.

ii) SaaS—based data that is centrally hosted at a remote facility that is commonly referred to as software as a service, or computing in the cloud.

Alternately or additionally, data element(s) are stored locally in the host running the application instance.

Optionally, data server 220 also runs data label generator 226 which generates and/or maintains respective labels for data elements.

Application control system 200 analyzes data element and application labels in order to determine the relevant operational policy. FIG. 2 shows the non-limiting embodiment in which operational policy 205 is stored on and/or generated by application control system 200. Alternately or additionally, the operational policy may be retrieved from an external policy repository or selected from policies stored on data server 220.

Upon identifying an activity by application instance 215 to perform an operation on data element 225 (for example an attempt to read or modify data element 225), application control system 200 obtains labels for application instance 215 and data element 225. In an exemplary embodiment, the activity by application instance 215 is detected by an element (such as a sniffer) on network 230 which monitors network communication (e.g. between host 210 and data server 220). Optionally, the network element ensures that the relevant application instance label and data element label 201 are provided to application control system 200.

Application control system 200 analyzes the application label 202 and data element label 201 in combination and determines which operational policy should be used. Based on operational policy 205, a control action is applied.

Optionally, application control system 200 obtains the data element label 201 and/or the application label 202 from label repository 240.

Optionally, the access control system performs, or assists in, credential management. Further optionally, upon identifying that credentials are required for performing the operation, corresponding credentials for performing the operation are obtained based on the operational policy. The corresponding credentials are provided to the application instance.

Optionally, the credentials are issued by:

a) Proxying a connection with a secure storage;

b) Providing the credentials directly from a secure storage; or c) Communicating with an authentication server and causing the authentication server to inject the credentials to the application instance.

FIGS. 3-7 illustrate exemplary configurations for an application control system, according to exemplary embodiments of the invention. The application label and the data element label may obtained by the application control system by any means known in the art (including but not limited to the embodiments described herein).

Figure 3:
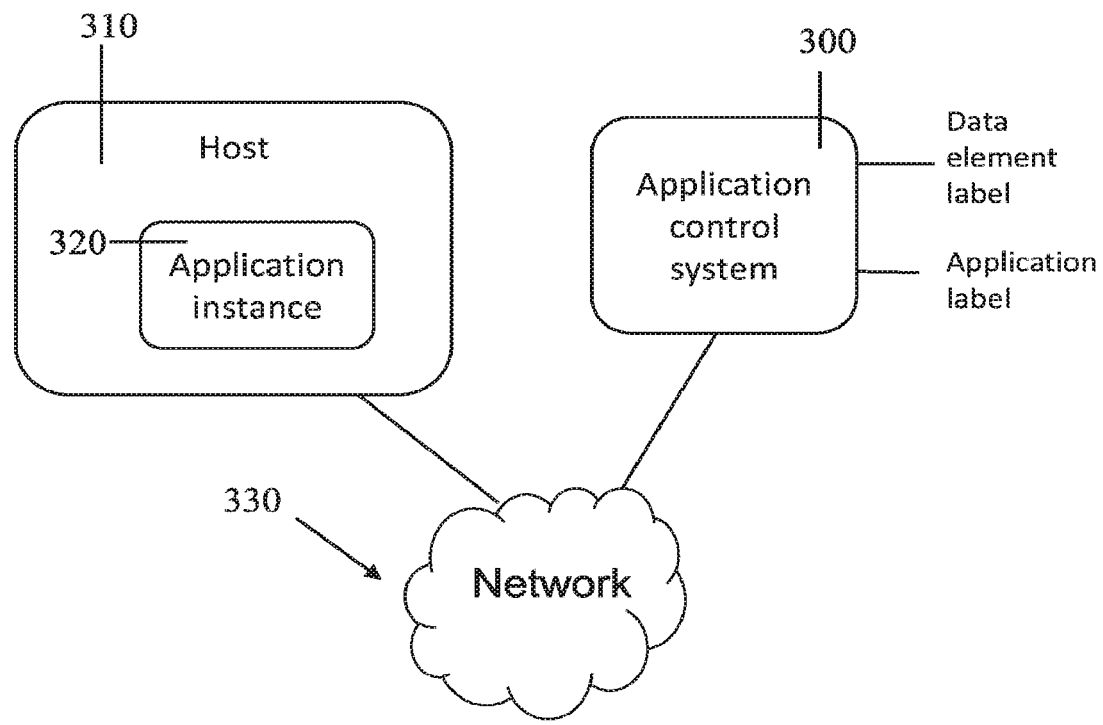
FIGS. 3, 4, 5, 6 and 7 are simplified block diagrams showing configurations of an application control system, according to respective exemplary embodiments of the invention.

In FIG. 3, application control system 300 is external to host 310 and controls host 310 remotely over network 330. In one exemplary embodiment, application control system 300 resides on at least one local server accessible via a local network. In a second exemplary embodiment, application control system 300 resides on at least one remote server accessible via an external network. In another exemplary embodiment, application control system 300 resides on at least one at least one cloud based asset.

Figure 4:
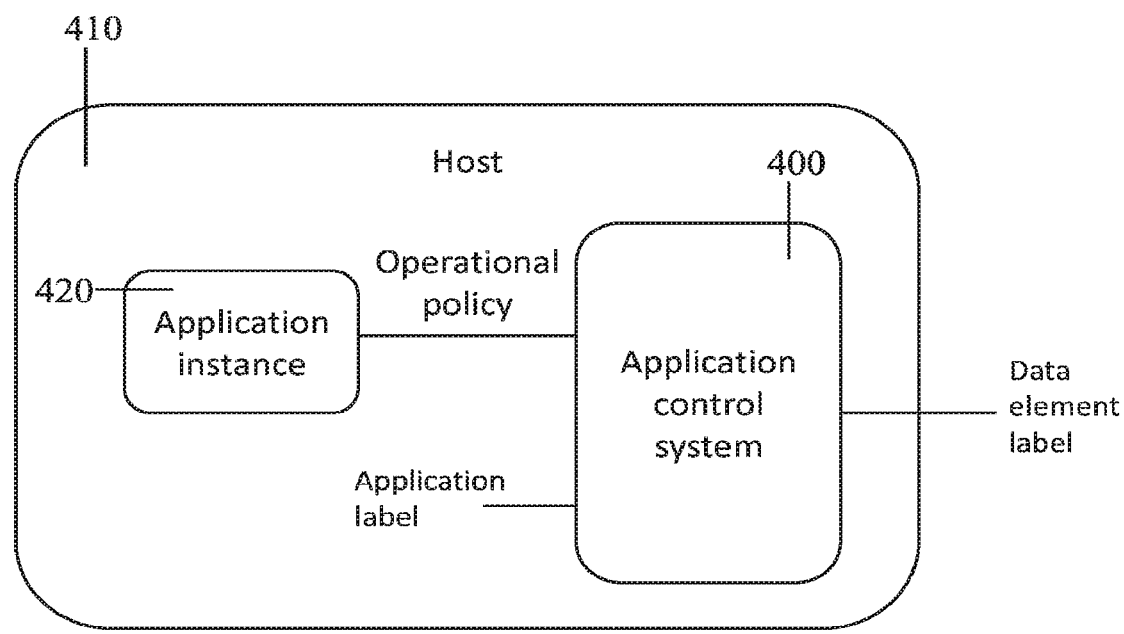

FIG. 4 illustrates an alternate exemplary embodiment in which application control system 400 resides on host 410 and applies the operational policy internally. Optionally, application control system 400 obtains the application label internally. Alternately or additionally the application label is provided by an external element (not shown). Data element(s) operated on by application 420 may be stored on host and/or accessed over a network from another location.

Figure 5:
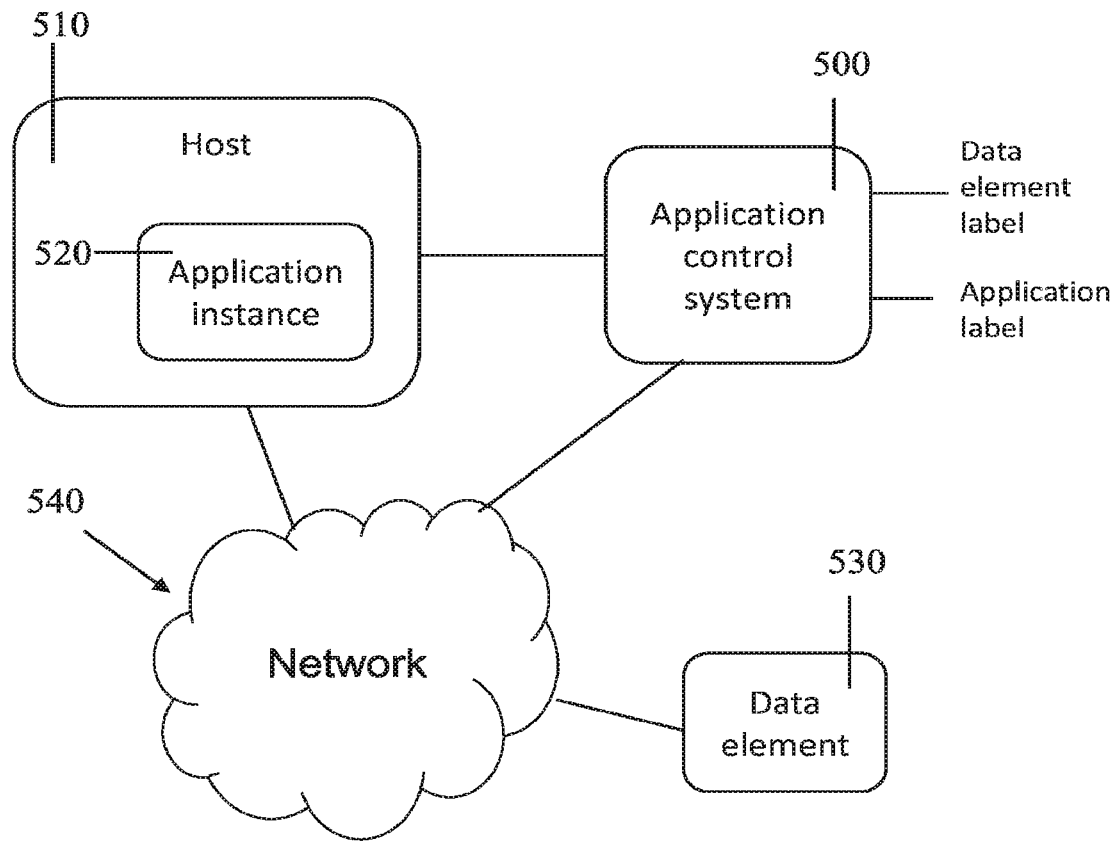

In FIG. 5, data element 530 (on which application instance 520 is attempting to perform an operation) is fetched by host 510 from another location. For example, the data element may be fetched from a local storage unit accessible via a local network or from a remote storage unit accessible via a remote network.

Figure 6:
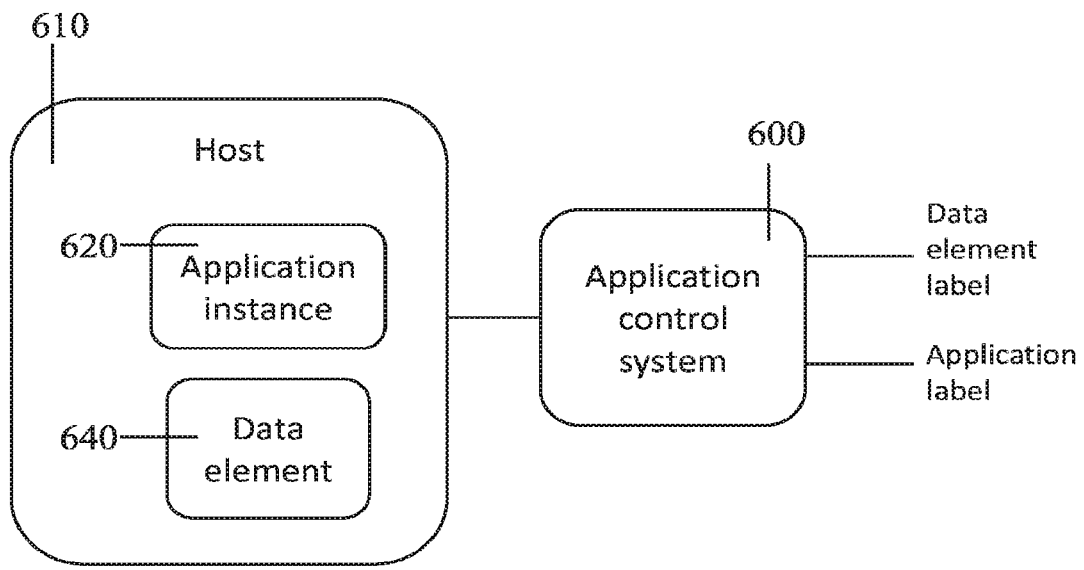

In FIG. 6 application control system 600 applies the operational policy at host 610 remotely. Data element 640 (on which application instance 620 is attempting to perform an operation) is stored in a local memory on host 610.

Figure 7:
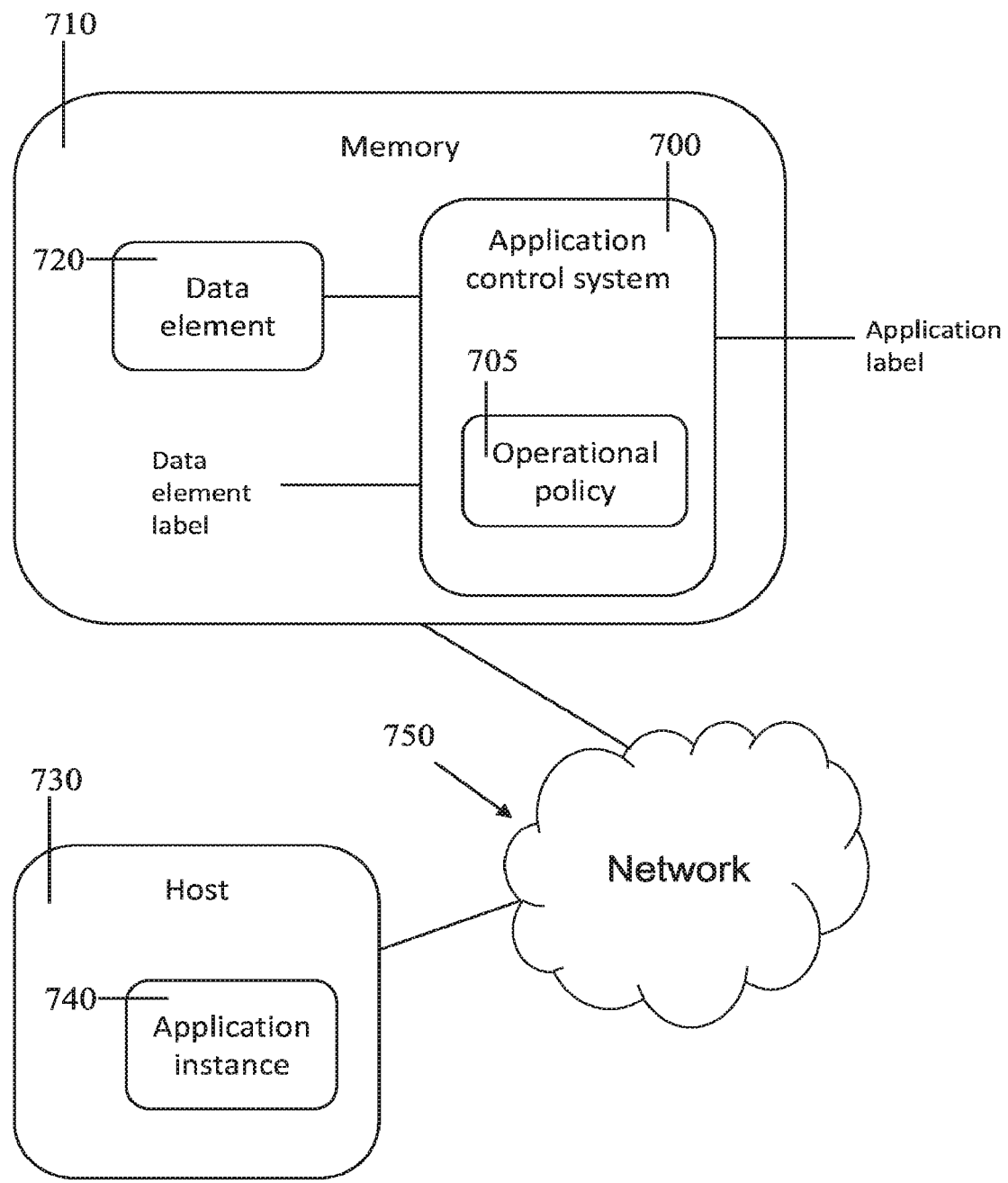

In FIG. 7, data element 720 (on which application instance 740 is attempting to perform an operation over network 750) is stored on memory 710 (where the term memory denotes any machine capable of storing data element). Application control system 700 resides one memory 710 and applies operational policy 705 internally at memory 710.

Figure 8:
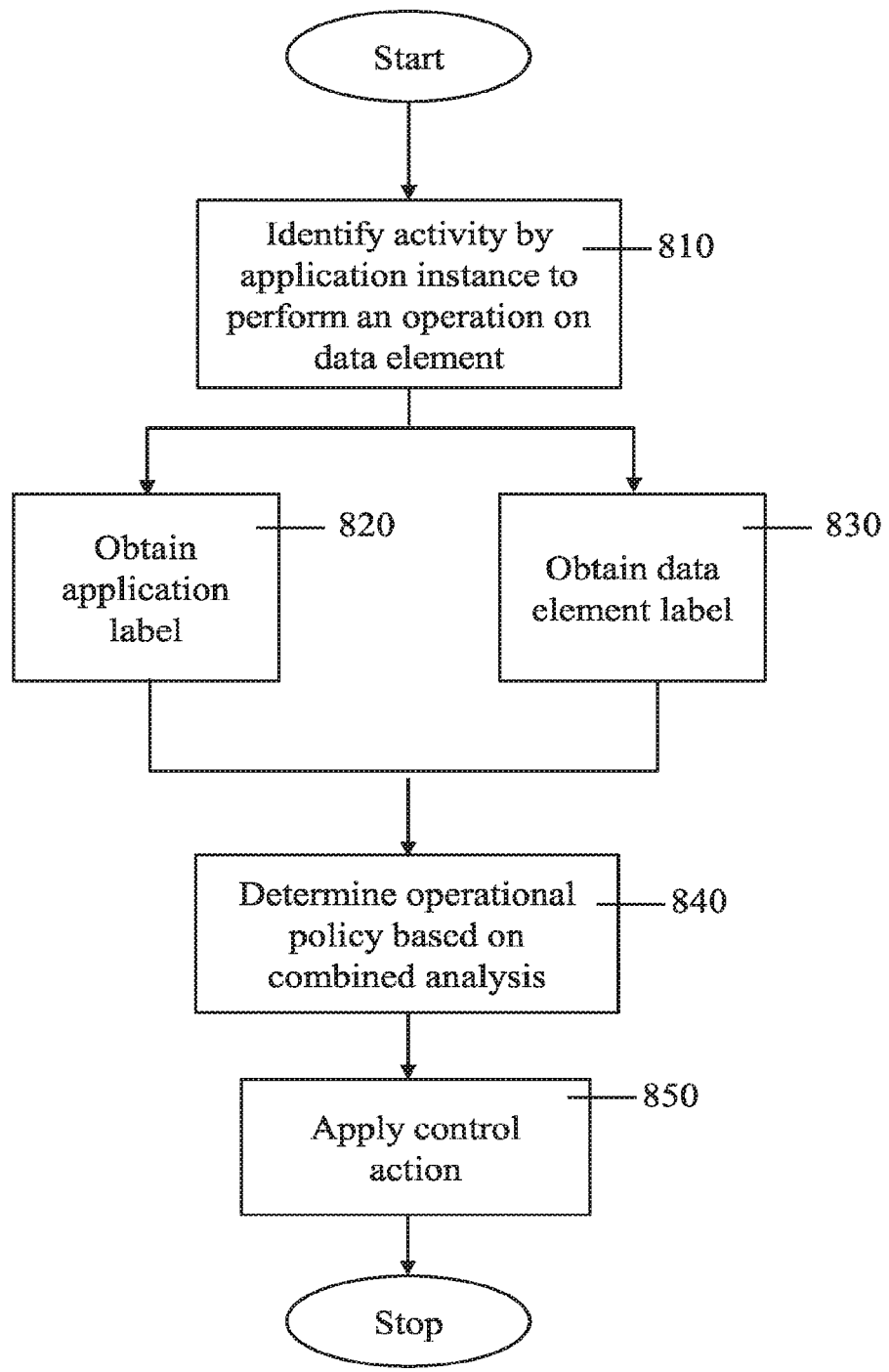
FIG. 8 is a simplified flowchart of controlling application operations on data elements, according to embodiments of the invention.

Reference is now made to FIG. 8, which is a simplified flowchart of method for controlling application operations on data elements, according to embodiments of the invention. Optionally, the method is performed by an application control system in accordance with embodiments described herein.

Optionally, an instance of an application running on a host (e.g. an endpoint machine) is monitored. Non-limiting examples of aspects of the application instance which may be monitored include, but are not limited to, operations performed by the application instance itself, operations by associated application instances, network communication by the application instance, data created/modified/deleted by the application instance, etc.

In 810, an activity by the running application instance to perform an operation associated with a data element is identified. Optionally, the operation on the data element is one of: execute, write, read, modify, create and delete.

In 820, an application label associated with the instance of the application is obtained. The application label includes information regarding the application instance (and optionally information about other instances of the application).

Optionally, the application label is an aggregation of information regarding multiple instances of the application. Exemplary embodiments of aggregating information from many application instances into a single application label are described below.

In 830, the data element label associated with the data element is obtained. The data element label includes information regarding the data element. Optionally, the data element label is an aggregation of information regarding multiple data elements.

In 840, an operational policy is determined based on a combined analysis of the data element label and the application label. The operational policy governs the operation of the application instance with respect to the data element (e.g. specifies operation permissions of the application with respect to the data element).

Optionally, the application control system obtains multiple application labels and/or multiple data element labels, and the analysis is based on a combination of the application labels and/or the data element labels.

Optionally, different operational policies are specified with respect to the data element for different instances of the application. The combined analysis of the data element label with the application label of a first instance of the application may yield one operational policy whereas the combined analysis of the data element label with the application label of a second instance of the application may yield a different operational policy.

Optionally, the operational policy is determined by reading a local policy file on the host. Alternately or additionally, the operational policy is determined by reading a policy file from a network resource accessible from the host.

Optionally, the application label and/or the data element label may contain no data. The absence of data in a label may itself be a factor which is used to determine the operational policy.

In 850, the application control system controls the operation performed by the application on the data element by applying at least one control action to the operation. The control action(s) are specified by the operational policy.

The timing and sequence of obtaining the application label and the data element label (820 and 830) are not necessarily dependent, as long as both the application label and the data element label are available to determine the operational policy used to control the operation. FIG. 8 shows an optional embodiment in which the application label and the data element label are obtained in parallel. Alternately, the application label and the data element label are obtained in sequential order (e.g. first the application label and then the data element label).

Optionally, auditing data is collected for the purpose of monitoring and auditing operations by application instances.

Optionally, activity in the network is monitored by following the labels on the data elements.

Policy Manager

Optionally, the application management system includes or communicates with a policy manager which manages the operational policies. The policy manager may run on any network component which allows it to perform its functions, for example a server in an internal network or a Cloud server. Optionally the policy manager manages one or more of:

a) Operational policy distribution;
b) Collecting policy audit information;
c) Generating an alert of an attempt to access the information resource in a way not specified or permitted by the operational policy;
d) Providing a user interface, for example to enable the user to create the policies. Optionally the policy manager includes pre-defined templates.
e) Managing the configurations of software agents, such as agents implementing the operational policy determination and/or labeling and/or controlling operations according to the operational policy.

Application Label for Multiple Application Instances

Optionally, the analysis which determines the operational policy is based on information regarding multiple instances of the application. The operational policy governs the operation of a particular application instance running on a host. In other words, the analysis used to determine the operational policy for a particular application instance may be based on information from multiple application instances, not only information about the specific application instance performing the activity and the specific data element on which the operation is to be performed.

The application instances may be running on the same host (e.g. endpoint machine) or on different hosts. Optionally the multiple application instances are correlated in some way, for example if they perform operations on the same specific data element or on data elements associated with the specific data element.

The information from multiple hosts may come in the form of data and/or metadata about the applications and/or application labels.

Optionally, in order for the application label to include information from multiple host machines the labels are shared amongst the hosts.

In some embodiments, the labels are shared amongst the hosts using a label server which generates application and/or data element labels. Labels may be generated for applications running on multiple hosts in the network, whether on a regularized basis, according to some defined logic or on some other basis. Alternately or additionally, the label server may generate a data label containing information about data elements stored on multiple storage units.

The label server is optionally configured to maintain a registry of available and/or relevant labels (application and data element labels) in the network. Optionally, the registry is external; for example, implemented in the form of a "Master" server in a containers environment. In other Cloud environments it may be on the Cloud management component. In on-premise environments the registry may be a central application registry or software/inventory management module.

Optionally, when multiple application labels and/or multiple data element labels are used, determining the operational policy includes:

a) Receiving multiple labels at the decision point (e.g. an application control system) and performing the analysis based on those multiple labels; and/or
b) Enriching existing labels with information from other labels, so that at the decision point the analysis is performed using just two labels, a single application label and a single data label.

Optionally, the data element label includes information indicating which applications and/or application instances accessed the data element, and, optionally, when and/or for what purpose the data element was accessed. When the data element label includes this information, it may not be necessary to collect information from multiple application instance labels. For example, the fact that many users sent the same document by mail will be reflected in the document's data element label and will thus be available when the operational policy is determined and applied to the next attempt by an application instance to access the data element.

Utilizing multiple application labels or an aggregated application label to determine the operational policy is when hosts of other application instances do not communicate with the data element (e.g. a particular document) but it is desired to include them in the decision. For example the operational policy may specify "only allow access if there are less than five instances of application labeled X running in the network". This scenario may be particularly appropriate for complex environments such as the Cloud or Containers.

In an exemplary embodiment, when an application instance attempts to perform an operation on a data element, application instance labels are collected for other application instances (e.g. from respective hosts) before determining the operational policy. In order to facilitate this collection, a registry of other application instances in the environment may be maintained, optionally with a mapping of relevance (e.g. which labels to collect for making the decision).

Optionally, the label server publishes labels to multiple hosts in the network. The publishing of labels may vary from one implementation to another and from one system environment to another. For example, the labels may be published whenever a new application label and/or data element label is generated or when a 'sensitive' label or 'possibly suspicious' label is generated. The labels may be published to all hosts or only to relevant hosts.

Operational Policy for Controlling the Operation of Untrusted Applications in a System Environment Some embodiments of the instant invention use an operational policy to control operations by an instance of an application with respect to a server. In such embodiments the operational policy is determined based on a combined analysis of the application label and information pertaining to the server. Some embodiments of using an operational policy to control operations by an instance of an application with respect to a server are described below. However the scope of the invention is not limited to the embodiments described below, but encompasses all applicable embodiments described above with respect to the controlling operations to data elements, where the combined analysis is based on the application label and information pertaining to the server and the control action is applied according to said operational policy to control the operation by the application instance with respect to the server.

Figure 9:
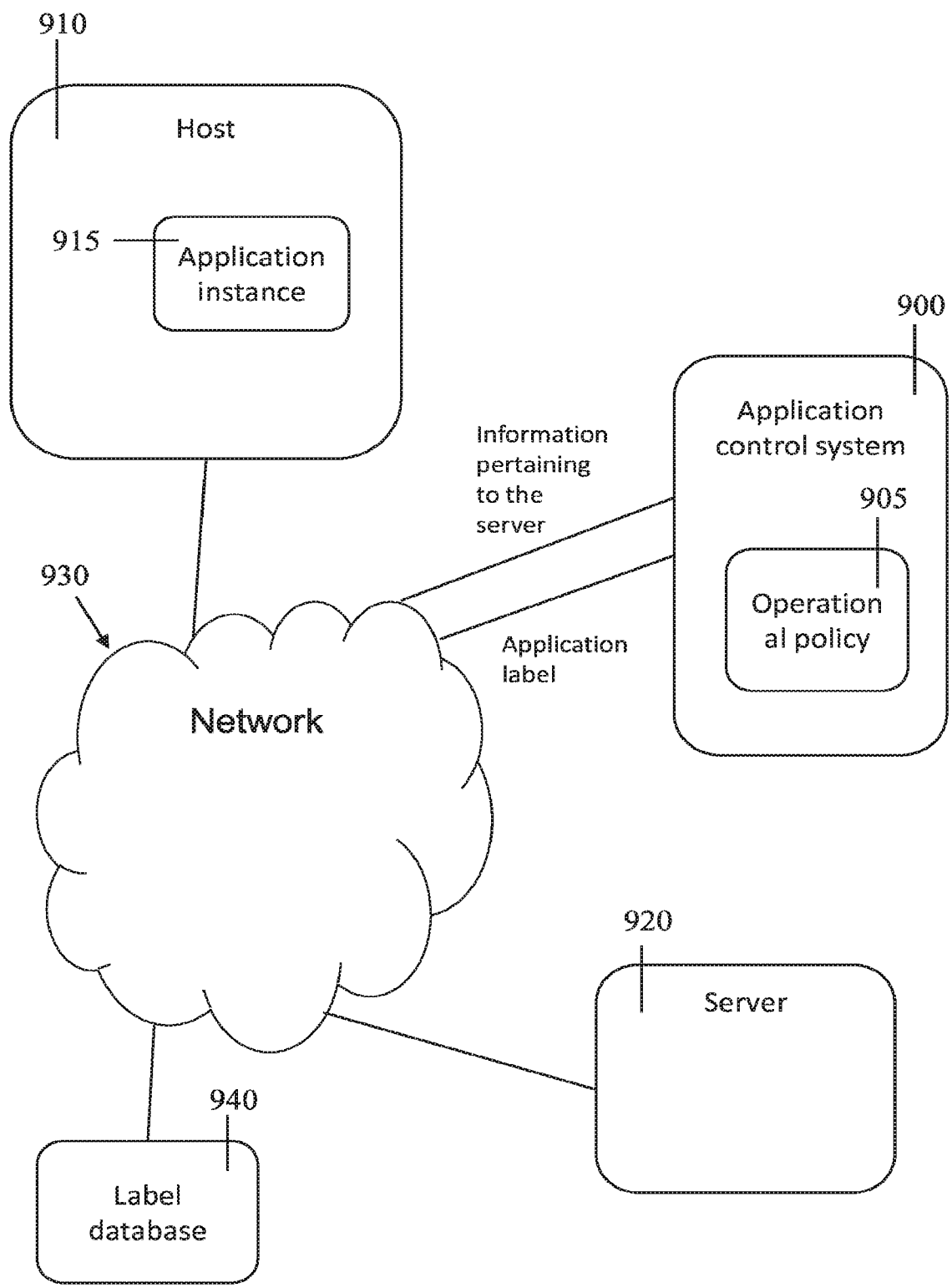
FIG. 9 is a simplified network diagram illustrating a configuration of the application control system in a network, according to embodiments of the invention.

Reference is now made to FIG. 9, is a simplified network diagram illustrating a configuration of the application control system in a network, according to embodiments of the invention. FIG. 9 corresponds substantially to FIG. 2, however in the embodiments of FIG. 9 application control system 900 performs the combined analysis on the application label and data pertaining to server 920.

Optionally the information pertaining to the server includes, but is not limited to, one or more of:
 a) a communication protocol associated with the server;
 b) an Internet Protocol (IP) address associated with the server;
 c) a port number indicative of a location of the server;
 d) a port number associated with the server;
 e) a host name associated with the server; and
 f) a Uniform Resource Locator (URL) address.

For example, the operational policy may restrict communication between an application instance and the server to a specific protocols, such as the Hypertext Transfer Protocol (HTTP) communication protocol. When an attempt by an application instance to communicate with a different protocol is identified, the application control system may deny (or otherwise restrict) the connection.

Optionally, the application instance runs on host 910 (as shown). Alternately or additionally, the application instance runs on server 920 (not shown).

Figure 10:
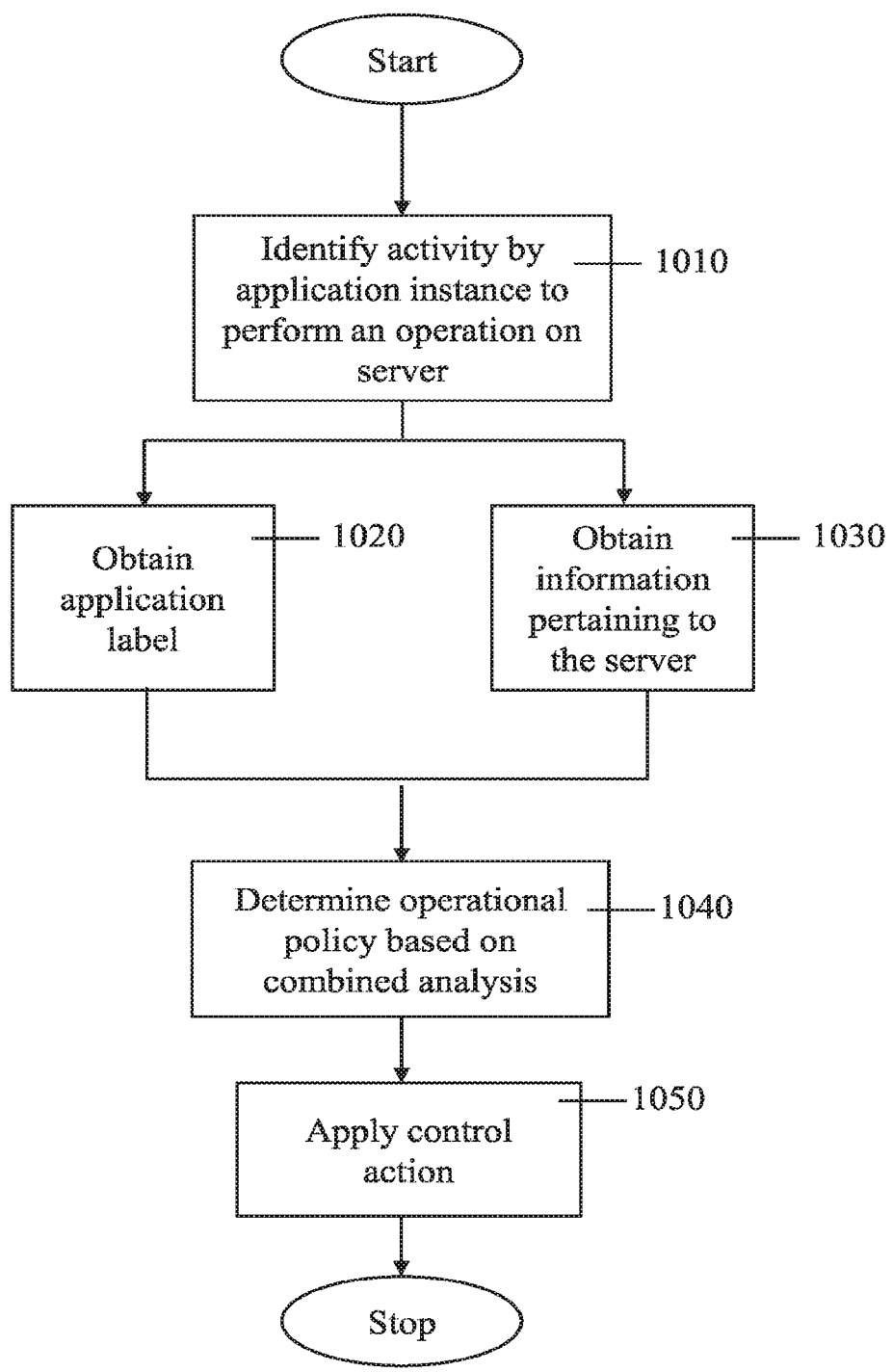
FIG. 10 is a simplified flowchart of controlling operation of untrusted applications in a system environment, according to embodiments of the invention.

Reference is now made to FIG. 10, which is a simplified network diagram illustrating a configuration of the application control system in a network, according to embodiments of the invention. FIG. 10 corresponds substantially to FIG. 8, however in the embodiments of FIG. 10 in 1030 the obtained information pertains to the server. Additionally, in 1050 the control action applied according to the operational policy controls the operation by the application instance with respect to the server.

Optionally, identifying the activity by the application instance includes intercepting an attempt by the instance of the running application to communicate with the server and/or intercepting an attempt by the instance of the running application to access the server.

Optionally, the applied control action includes one or more of:
 a) permitting the instance of the application to perform the operation on the server;
 b) restricting an ability of the instance of the application to perform the operation on the server;
 c) denying the operation;
 d) controlling access by the instance of the application to the server;
 e) collecting audit data for operations performed by the instance of the application on the server;
 f) monitoring operations performed by the instance of the application on the data element in real-time to identify violations of the operational policy;
 g) isolating the host from accessing a network;
 h) isolating the host from being accessible over a network;
 i) isolating the host from the system environment of the target machine; and
 j) triggering an alert.

The control action may be performed by any means known in the art. For example, control actions that involve isolating the host may be implemented by a driver on the host machine and/or by applying a firewall configuration which blocks network access by the host.

Use Cases

Following are three use cases illustrating exemplary embodiments of the invention.

Use Case 1—Ransomware Protection Policy

Ransomware is a form of malware designed to infect machines, encrypt as many files as possible and hold the decryption key for ransom until the victim submits the required payment. Most anti-malware and anti-ransomware solutions today focus on blocking malware at the point of inception. These solutions may be helpful when it is known what to look for, but when it comes to ransomware there are new variants coming out every day. It is extremely difficult to stay ahead of the attackers and block all variations of ransomware from entering a network.

The solution provided by exemplary use case 1 is based on an operational policy denoted the Ransomware Protection Policy (RPP) that is applied to operations by the running application instance. The Ransomware Protection Policy protects files and documents from ransomware, and may be suitable of other types of known or yet to be known malware.

The RPP controls operations and/or access by the application instance to the specified files. For example, the RPP may identify known trusted applications. Control actions are applied to allow access to the data element by instances of known trusted applications while access by other application instances is controlled (whether limited or restricted or other, according to the specific implementation). By limiting access by unknown (potentially ransomware) applications to the document files, document files are protected from a ransomware attack.

The RPP controls operations of an application instance based on information obtained from the application label(s) and/or data element label Optionally, the application label includes information one or more of:
 i) Application file location, checksum, name, owner, version, product name, description, publisher, runtime arguments, etc.
 ii) Application source (e.g. installed by Microsoft System Center Configuration Manager, installed from the package downloaded from the specific URL, specific organizational network share, removable device, received by email, copied from another computer, installed by the specific user group, etc.).
 iii) Account using the application instance;
 iv) Operations performed by the application instance;
 v) Creator of the application; and vi) Communication protocol associated with the application.

Optionally, the data element label includes one or more of:
i) Specific file types (e.g. all the Microsoft Office files);
ii) Specific location of the data element (e.g. all the Microsoft Office files located on all the organizational shares and local disks);
iii) The source of the data;
iv) Application type associated with the data element;
v) Communication protocol associated with the data element; and
vi) Accounts which accessed the data element.

Optionally, the RPP is implemented on the kernel mode drivers (e.g. "Windows File System Minifilter Driver" for file system/registry access control and/or "WFP—Windows Filtering Platform Driver" for network access control).

Some ransomware uses a well-known (possibly trusted) application to access and encrypt the data files (e.g. the malware runs cmd.exe and encrypts the files using commands passed to cmd.exe, or injects the malicious code to the memory of the running Microsoft Word application). In order to protect the data elements from such ransomware, the Ransomware Protection Policy may include the additional protection rules such as:
i) Protect the trusted application from any kind of injection from the untrusted application (e.g. restrict the access to the memory of the trusted running application instance from any unknown untrusted process); and/or
ii) Protect the specified data files from the access by the trusted application if the current application instance (process) is compromised (e.g. the trusted application was launched by some unknown untrusted application).

Optionally, the Ransomware Protection Policy includes the specific settings for auditing ransomware attacks, logging attempts to access the files and/or end-user notifications about such events.

Use Case 2—Server Access by Untrusted Application Protection Policy

The most sensitive data in most organizations is often located on the organizational servers (placed on premise or on the Cloud). The major purpose of many types of malicious software is to get access to the organization's data and to steal the sensitive information. Use case 2 deals with application to server control, in order to protect the server from access by and/or operation with untrusted applications. This protection may include controlling the operation of an application on a particular server, including interaction and communication of an application instance with respect to a particular server.

The solution provided by the exemplary use case is based on an operational policy denoted the Server Protection Policy (SPP). According to the SPP only trusted known application instances may access the protected server. Any network access of the protected server by an unknown untrusted application instance is blocked.

In an exemplary embodiment, the SPP determined based on the information specified in the application label and information pertaining to the server (e.g. as shown in FIG. 10).

The SPP may be applied to control operations by an application instance, based on information and data included in one or more application labels including but not limited to:
i) Application file location, checksum, name, owner, version, product name, description, publisher, runtime arguments, etc.
ii) Application source (e.g. installed by Microsoft System Center Configuration Manager, installed from the package downloaded from the specific URL, specific organizational network share, removable device, received by email, copied from another computer, installed by the specific user group, etc.).
iii) Account using the application instance;
iv) Operations performed by the application instance;
v) Creator of the application; and
vi) Communication protocol associated with the application.

The SPP includes the appropriated server set (assigned to the specific application instance) defined by the hostname, IP, location, URL, etc. In the context of the use case 2, these servers are considered data elements. This type of information about the identity of the server may be specified and obtained from the application label and/or may be specified in the request for connection or operation.

The SPP controls the network operation and/or access of the requesting application instance to the specified servers. For example, any network access initiated by the trusted application instance is allowed whereas any network access initiated by any other application instance is controlled, restricted or completely blocked.

The appropriate SPP is applied on the application instance's launch (e.g. launch of an application instance running on an endpoint machine). All the active policies are considered in order (sorted by the priority). Once the launched application instance is matched by some policy, the appropriate restriction rule is activated. In one example, the Windows Filtering Platform Driver (WFP) is used for the network access control. Using the WFP driver, the network connection from the application instance to the appropriate server is blocked.

Non-limiting examples of SPPs include:
i) Allow Microsoft Outlook to connect to Microsoft Exchange servers; and
ii) Allow signed by Microsoft Corporation and Adobe Systems application instances to connect to SharePoint Servers.

An additional protection layer may be added to the Server Protection Policy. Since the trusted application instance is allowed to connect to the sensitive servers, specific trusted application instances may be isolated from the environment (e.g. local/network storage, public internet, removable devices, etc.). This protects the information accessed by the trusted application instance. Examples include but are not limited to:
i) Protect the specific Microsoft Word process connected the Microsoft SharePoint server to save any documents locally or to upload them to the cloud; and
ii) Isolate the specific Microsoft Internet Explorer instance connected to the sensitive Intranet Server from the public Internet.

Some types of malicious software use a well-known (usually trusted) application instance to connect to the servers in order to steal the information. To protect the servers from such malware the Server Protection Policy may include additional rules including but not limited to:
a) Protect the trusted application instance from any kind of injection from the untrusted application (e.g. restrict the access to the memory of the trusted application instance from any unknown untrusted process); and
b) Protect the specified servers from the network access by the trusted application instance if the current application instance (process) is compromised (e.g. the trusted application instance was launched by some unknown untrusted application).

Optionally, the SPP includes the specific settings for auditing malware attacks, logging attempts to access a protected server and/or end-user notifications about such events.

Use Case 3—File Forwarding by Trusted Application Protection Policy

There are many applications designed for communications and conversations (e.g. email clients, messengers, etc.) that may attach and forward messages, documents, files and other items. In some cases it is important to prevent such applications from sending sensitive files (e.g. out of the corporate perimeter). Since the applications are allowed and trusted, they cannot be restricted using a Ransomware Protection Policy.

Use case 3 deals with controlling the operation and use of the application instance with specific data elements outside of the organizational perimeter (for example interacting and communicating with other systems and services that are outside the organizational perimeter). This protects sensitive message, data, files and the like from being distributed outside of the organizational perimeter.

The solution provided by use case 3 is based on an operational policy denoted the File Forwarding/Distribution Protection Policy (FFPP). According to the FFPP specific trusted application instances may be run normally but they are not allowed to access the protected files.

The FFPP controls operations by an application instance based on information and data included in the application and data element labels. Access by the application instance to the specified files is controlled as defined in the policy (e.g. restricted, blocked, etc.)

Application labels optionally contain information and data including but not limited to, for example, combinations of:

i) Application file location, checksum, name, owner, version, product name, description, publisher, runtime arguments, etc.;

ii) Application source (e.g. installed by Microsoft System Center Configuration

Manager, installed from the package downloaded from the specific URL, specific organization's network share, removable device, received by email, copied from another computer, installed by the specific user group, etc.);

iii) Account using the application instance;

iv) Operations performed by the application instance;

v) Creator of the application; and vi) Communication protocol associated with the application.

Data element labels optionally contain information and data including but not limited to combinations of:

i) Specific file types (e.g. all the Microsoft Office files); and ii) Specific locations (e.g. all the Microsoft Office files located on all the organization shares and local disks).

For example the FFPP may:

i) Prevent Microsoft Outlook to attach any files from the local disk or network share to the outgoing emails; and ii) Allow Skype in the organization for the messages only, whereas no files are allowed to be forwarded using Skype.

Optionally, the FFPP includes the specific settings for auditing attempts to forward the sensitive files and/or end-user notifications about such events.

In an exemplary embodiment with multiple hosts, the FFPP is determined based on an analysis of multiple application labels (from multiple hosts) in combination. For example, sending a document out from the organization may be permitted. However if a trend is identified of sending documents of the same type and from the same source and to the same recipient at different hosts such sending operations will be blocked or restricted. This type of control may not be effective based on an analysis of labeled data (e.g. application label and data element label) on a single host but an analysis of labeled data from multiple hosts gives additional context and relevant control.

Exemplary Embodiment in Microsoft System Environment

In an exemplary embodiment, the control action is applied using Microsoft kernel mode and user mode hooking tools such as:

1) File System—Microsoft File System Minifilter kernel driver may be used to control the access to the file system (open file/folder, create file/folder, change file/folder attributes, rename/delete file/folder, etc.);

2) Registry—Microsoft Filtering Registry Calls kernel driver may be used to control the access to the Registry (read/write/create/delete/change attributes of the registry keys and values);

3) Network—Microsoft Windows Filtering platform APT may be used to control the access to the Network (incoming and outgoing network connections);

4) Process Execution—Microsoft Process start/stop filtering kernel API may be used to control the process execution PsSetCreateProcessNotifyRoutineEx; and 5) Specific Windows API calls—Microsoft Detours software package (user mode hooks) may be used to control any specific Windows API call of the running application.

These tools enable controlling the access of any process running on the host to data element(s), and optionally to other resources, according to the operational policy. We intercept the application instance (e.g. process) that is launching, check active operational policies and apply the operational policy with the highest priority that matches the process that is launching.

Examples of control actions which may be applied with these tools include but are not limited to:

a) Denying, restricting or approving the operation. For example, blocking attempts to: read a file, to modify a file, to execute a program, to read/modify a registry key or value, to connect to some IP/hostname, to access the memory of some process, etc.;

b) Isolating the application instance from the system environment of the host and/or from the system environment having access to the data element; and c) Resetting the host.

Exemplary Implementation

An exemplary implementation of the invention involves the following main elements (A-E), as described below.

A. Application labeling process—a process which labels instances of an application.

B. Data labeling process—a process which labels data or data elements.

For the application labeling process and/or the data labeling process the labeling may be performed at a different server or machine (for example, by identifying or in any discovery of existing applications and data on the disk). Optionally, the labeling is performed in real-time in a localized manner on the server, or system of the invention. For example, in any attempt to create or write to a new or existing data file on the disk.

C. Operational policy—defines allowable and/or permitted operation and/or use of the data elements with the application instance. The operational policy is determined based on a combined analysis of the application and data element labels.

In the exemplary implementation, the operational policy governs the use and/or operation of a specific application instance with respect to specific data elements. For example:

a) Defining from which machine or service or device, and/or via which server and/or from which location, the application instance may run from or operate on;

b) Defining from which account and/or with which credentials the application instance may operate;

c) Defining which data elements and/or which type of data may be used and in what manner it may be used (for example accessed, uploaded, downloaded, shared) by a particular application instance.

Optionally, the operational policy is determined and/or defined and/or updated at a separate location from the host (e.g. a network server) according to the system requirements.

D. Applying the Operational Policy—Controlling the use and/or operation of an application instance on the host with respect to particular data element(s) based on the operational policy. Non-limiting examples include:

a) Controlling use and operation of an application with different data;

b) Controlling different instances of the same application;

c) Denying or approving the operation of the application with respect to the particular data and/or the use of data from the application instance;

d) Monitor/create/audit/control operations by restricting or limiting the use of the data elements with the application;

e) Blocking the application instance;

f) Stopping or isolating the host (when assumed to be compromised).

E. Providing credentials (optional)—Providing the corresponding credentials for operating and/or using of application instance with the specified/requested data. The credentials may be provided, for example, by a credentialing system such as the vault or from a local or externally fetched file.

Optionally, aspects of the exemplary implementation are implemented using one or more software agents, for example designed in the form of a kernel driver in the operating system of the operating system (OS) on the host.

In a specific example for a Microsoft Windows environment, the access control system is implemented as two software agents, the Application Control (AC) Driver and the Application Control (AC) Agent. The AC Driver and AC Agent interact as follows:

1. AC Driver intercepts process start and synchronously passes the flow to AC Agent service 2. AC Agent matches process parameters with policy parameters 3. AC Agent retrieves outbound credentials (user name, domain name and password) that should be used according to the matching operational policy. E.g. the credentials could be received from a credential vault.

4. AC Agent impersonates the process user and then calls LogonUser API passing LOGON32_LOGON_NEW_CREDENTIALS logon type flag. LogonUser API creates new Logon Session for the logged-on user and attaches the provided outbound credentials to the Logon Session.

MSDN: LOGON32_LOGON_NEW_CREDENTIALS—
This logon type allows the caller to clone its current token and specify new credentials for outbound connections. The new logon session has the same local identifier but uses different credentials for other network connections.

5. AC Agent assigns the new access token to the process and returns the flow to AC Driver 6. When the process accesses local resources it is authenticated based on the current logon user access token. There are no changes in the process behavior when it accesses local resources.

7. When the process accesses remote network resources (e.g. network share, Web Server using Windows Authentication, etc.) it is authenticated with the new outbound credentials. For example:

1) The system identifies need for credentials for operating or using the application with the specific data 2) The system automatically gets the appropriate credentials from the Vault 3) The system attaches the appropriate security tokens to the end-user application instance—Microsoft Office These embodiments provide a solution on the endpoint that is completely transparent to a user and/or automated tool on the endpoint.

The labeling of application instances and data elements may take into account various factors, some of which may include:

the source of the data—whether the data is coming Internet, removable media, internal network (e.g. Network File Shares, or Intranet Download Portal), specific domain or IP address within the network, pre-installed ("Golden Image", i.e. the initial configuration of a machine in the network that is installed as the basis for new machines), update or self-update (an existing application updating itself), user downloaded, email, organizational software distribution system (e.g. Microsoft System Center Configuration Manager), remote copy from one computer to another (e.g. using C$-admin share);

accounts—that created the resource, that was logged on during the creation, that modified or accessed the resource at any time;

time—of each of previous operations;

creator of the application—vendor, internal group/user, etc.;

groups—relating the element to a group of similar elements, such as by orig;

other features—digital signatures, "scanned by AV", "released from quarantine", "reviewed by DLP" etc.;

Special case—external Reputation databases, Threat Detection systems (e.g. sandboxes)—Viewfinity integrated today with 2 Reputation databases and 3 Threat Detection systems;

which applications are being associated with the data element, for example which applications previously used, or attempted to use the data element;

a communication protocol associated with a data element;

a communication protocol associated with an application;

other identification information associated with the user or process involved in the session.

In some cases the same type of application (e.g. Internet Explorer) may be used to access both the sensitive and the public resources. In such case the different instances of the same application may be separated. For example an Internet Explorer instance connected to a sensitive corporate Intranet Server will be isolated from another Internet Explorer instance connected to the public Internet.

Exemplary Algorithms for File Origin (i.e. Application Source)

The following examples illustrate the types of information which may be included in application labels and in data element labels. As used in the examples below the term "process" is used as an example of an instance of an application and the term "file" is used as an example of a data element.

A File Origin is attached to the application file (e.g. executable file located on the hard disk). When an application file is created, the process that is creating the application file and its run-time parent processes are analyzed. The File Origin based on this analysis is attached it to the application file. Once the application is launched the File Origin attached to the application file may be analyzed so as to apply the appropriate operational policy to the running process.

Information that may be included in the application label (e.g. of the process) includes but is not limited to:

1) Run-time Parents of a process: the hierarchy of the process's parental processes;

2) Immediate Parent of a process: the Run-time Parent that creates the process.

Information that may be included in a data element label (e.g. of the file) includes but is not limited to:

1) Immediate Parent of a file: the process that creates the file;

2) Create-time Parents of the file: the file's immediate parent and the Run-Time parents of the file's immediate parent. It is possible that a file does not have Create-time Parents (e.g. files which appeared on the disk out of monitoring by a VF Agent).

3) Create-time Grandparents of the file: the Create-time Parents of the file's Create-time Parents.

Optionally, information which is intended to be included in a label is analyzed when the label is created, and possibly altered as a result of the analysis. For example, if a data element label includes too many Create-time Parents some of the Create-time Parents may be replaced or removed as described in the example below.

Create-Time Parents Lists

When a file creation activity of a monitored type of file (e.g. EXE, MSI, etc.) is captured, information about the process that created the file (i.e. the file's immediate parent) and about the run-time parents is stored with the file in its Extended File Attributes (EA). Extended File Attributes are file system features that enable users to associate computer files with metadata not interpreted by the file system. The File Origin XML is stored in Extended File Attributes attached to the file.

The data element label includes the timestamp of the new file creation and properties of the file's immediate parent and the run time parents of the immediate parent, such as:

a) For a regular process: full path, command line, publisher, product, etc.

b) For Windows Services: service name, full path, etc.

c) For MSI files: publisher, product, etc.

Some examples are:

A) For a file downloaded by manually launched update of a product:

| Timestamp | Process File (Application File) | Process Command Line |
|---|---|---|
| 2013-01-29 12:05:12.345 | C:\WINDOWS\Explorer.EXE | C:\WINDOWS\Explorer.EXE |
| 2013-01-29 12:05:12.345 | D:\util\totalcmd\TOTALCMD.EXE | "D:\util\totalcmd\TOTALCMD.EXE" |
| 2013-01-29 12:05:12.345 | C:\WINDOWS\System32\WScript.exe | "C:\WINDOWS\System32\WScript.exe" "C:\ProgramFiles\vendor\product\update.vbs" |
| 2013-01-29 12:05:12.345 | C:\ProgramFiles\vendor\product\check_updates.exe | check_updates.exe |

B) For a file written by a service synchronizing RSS feeds (attached to custom feed.msi):

| Timestamp | Process File (Application File) | Process Command Line |
|---|---|---|
| 2013-01-30 11:49:00.865 | C:\WINDOWS\System32\smss.exe | \SystemRoot\System32\smss.exe |
| 2013-01-30 11:49:00.865 | C:\WINDOWS\system32\winlogon.exe | winlogon.exe |
| 2013-01-30 11:49:00.865 | C:\WINDOWS\system32\services.exe | C:\WINDOWS\system32\services.exe |
| 2013-01-30 11:49:00.865 | C:\WINDOWS\system32\svchost.exe | C:\WINDOWS\system32\svchost -kDcomLaunch |
| 2013-01-30 11:49:00.865 | C:\WINDOWS\system32\msfeedssync.exe | C:\WINDOWS\system32\msfeedssync.exe sync |

C) For a file manually copied file from CD (attached to my_app.exe):

| Timestamp | Process File (Application File) | Process Command Line |
|---|---|---|
| 2013-01-30 14:51:26.450 | C:\WINDOWS\Explorer.EXE | C:\WINDOWS\Explorer.EXE |
| 2013-01-30 14:51:26.450 | D:\util\totalcmd\TOTALCMD.EXE | "D:\util\totalcmd\TOTALCMD.EXE" |

In order to optimize information included in the data element label and/or application label (e.g. to shorten the list of processes) further analysis and/or rules may be used such as:
1) Predefined helper lists of executable files:
   List of executable files for which the file itself and all its Run-time Parents should not be included in the label (e.g. svchost.exe, services.exe, explorer.exe if it is not the Immediate Parent of the process or file, etc.);
   List of executable files which are included in the label but their Run-time Parents should be ignored (e.g. explorer.exe if it is the Immediate Parent of the process or file, all files of parent type Internet, etc.);
   List of executable files that should not be included in the label but whose Run-time Parents should be included;
   List of recognized script engines which should be replaced with corresponding scripts.
2) For MSI installations—replacement of the correspondent executable files with the original MSI file.

Following are respective condensed lists obtained for the examples above:

A) For a file downloaded by manually launched update of a product:

| Timestamp | Process File (Application File) | Process Command Line |
|---|---|---|
| 2013-01-29 12:05:12.345 | C:\ProgramFiles\vendor\product\script.vbs | "C:\WINDOWS\System32\WScript.exe" "C:\ProgramFiles\vendor\product\update.vbs" |
| 2013-01-29 12:05:12.345 | C:\ProgramFiles\vendor\product\check_updates.exe | check_updates.exe |

B) For a file written by a service synchronizing RSS feeds (attached to custom_feed.msi):

| Timestamp | Process File (Application File) | Process Command Line |
|---|---|---|
| 2013/30/01 11:49:00.865 | C:\WINDOWS\system32\msfeedssync.exe | C:\WINDOWS\system32\msfeedssync.exe sync |

C) For a file manually copied file from CD (attached to my_app.exe):

| Timestamp | Process File (Application File) | Process Command Line |
|---|---|---|
| 2013-01-30 14:51:26.450 | D:\util\totalcmd\TOTALCMD.EXE | "D:\util\totalcmd\TOTALCMD.EXE" |

Optionally, if the list is too long then it is cut to have only N items (e.g. bottommost 10 items).

The resulting list is the newly created file's Create-time Parents.

Additional heuristics may be added, resulting in new categories of Create-time Parents, for example:

To recognize that a file was copied from an external (network share, USB drive, etc.) location and to add the original external file as the Immediate Parent of the newly created file.

To recognize that a file was copied from a local location (hard drive) and to copy the original file's Parents/Grandparents to the newly created file.

To recognize that a file was downloaded from Internet and to add the original Parent recognized as "Internet" as an Immediate Parent of the newly created file.

When a file is recognized as downloaded from Internet, to identify the network address (e.g. URL) that originated the file and to add the info about the URL to the file's "Internet" Parent.

Create-Time Grandparents Lists

When a file is created, in order to recognize its principal origin it is often necessary to take into account the parents of the file's parents (e.g. at time $t_1$ a program a.exe creates its own updater b.exe, at time $t_2$ b.exe downloads c.exe, which at time $t_3$ c.exe creates a new a.exe). In real operation much more complicated scenarios often occur.

This indicates that the Create-time Parents of each of the Create-time Parents of a newly created file, and all of their respective create-time parents should be analyzed. Ideally, due to flexible definitions of Parent Types (e.g. addition/changing of custom Updaters) all these lists of lists of Parents should be kept forever, as theoretically any of them may be useful for future better heuristics. However this may entail storing a large amount of information along with the files or in a centralized data store.

Optionally, in addition to the shortening of the Create-time Parents described above the list of Create-time Grandparents is shortened as well.

In one example, parent types are defined, where each parent type has specific properties associated with it. For example:

Internet: processes most likely creating files downloaded from Internet (e.g. iexplore.exe, chrome.exe, ftp.exe, skype.exe, icq.exe, etc.). In some cases the exact URL cannot be identified, so the file origin of the file will be just "Internet". However, in most cases the URL or IP address is known, so the file origin may include the URL or IP address.

Email: processes recognized as email clients (e.g. outlook.exe, etc.). The sender email address, timestamp of the email, etc. may accomplish this info.

Updater: processes recognized by either pre-defined or custom parameters and most likely performing the only role of either installing of new applications or updating some existing applications (e.g. ccmrepair.exe, ccmexec.exe, jusched.exe, etc.)

Local Share: process system, when its activity is recognized as CIFS server (i.e. the file is created on the computer by a remote CIFS client). Network address of the client, name of the Shared Folder on the computer, etc. may accomplish this info.

Share: processes launched from a network share (e.g. \\Srv\util\TotalCommander\totalcmd.exe, \\Srv\install\Skype\skypesetup.exe, etc.)

Removable: processes launched from a removable storage like diskettes, flash drives, etc. (e.g. F:\install.exe, G:\hidden\virus.exe, etc.).

CDROM: processes launched from a removable optical storage like CD/DVD/etc. (e.g. F:\install.exe, G:\hidden\virus.exe, etc.).

Create-time Parents which are not a special type have a "default" Parent Type (e.g. Local which usually reside on local hard drives).

When a file creation of a monitored type (EXE, MSI, etc.) is captured, the list of its Create-time Parents is created (see above). Then for each of the Create-time Parents its Create-time Parents and Create-time Grandparents (if any) are copied into another list, then all Parents and Grandparents of the newly added list elements are added, and so forth until the desired level of detail is obtained.

For example the following list is built from 3 sub-lists (Parent/Grandparent lists of Parents/Grandparents):

| 1 | $t_1$ | 1.exe |
|   | $t_1$ | 2.msi |
|   | $t_1$ | 3.exe |
| 2 | $t_2$ | 4.exe |
|   | $t_2$ | 5.exe |
| 3 | $t_3$ | 6.exe | where ($t_3 > t_2 > t_1$)

After the list is completed, it is analyzed from bottom to top (i.e. from the "closest" file to the "farthest" file) in order to recognize a "special" parent type. If an entry matches several Parent Types, one of the matching types is taken according to the following precedence order:
1) Internet
2) Email
3) Updater
4) Local Share
5) Share
6) Removable
7) CDROM E.g. file \\srv\util\ftp.exe will get Parent Type "Internet" and not "Share".

The sub-list with the first "special" Parent Type found remains, all other sub-lists are removed. In case no "special" Parent Type found, the bottommost sub-list remains.

In the example above, if the file 4.exe is recognized as e.g. "Updater", the resulting list will contain the sub-list 2, i.e. the files 4.exe and 5.exe:

| 2 | $t_2$ | 4.exe | Updater |
|   | $t_2$ | 5.exe |         |

The resulting list is the newly created file's Create-time Grandparents.

Additional information which may be included the file's label includes:

Creator: The user who created the file;

installation: for MST files and for EXEs recognized by heuristics;

Reputation: this information may be added to the label stored when the reputation info becomes available (possibly later in time than the file creation).

User Interface and Display

Some or all of the label information may be provided and/or displayed to a user via a user interface. The type and format of the label information thus provided will vary based on the requirements of the specific implementation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant applications, application instances, data elements, operations, labels, operational policies and control actions will be developed and the scope of the term application, application instance, data element, operation, label, operational policy and control action is intended to include all such new technologies a priori.

The terms "comprises", "comprising", "includes", "including", "having" and their conjugates mean "including but not limited to".

The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for controlling application operations on data elements, comprising:
   identifying an activity by an instance of an application running on a host to perform an operation associated with a data element;
   obtaining an application label comprising information identifying a source of the application, the source of the application comprising at least one parent process in a first hierarchy of processes associated with creation of the application;
   obtaining a data element label comprising information identifying a source of the data element, the source of the data element comprising at least one parent process in a second hierarchy of processes associated with creation of the data element;
   determining, based on an analysis of the source of the application and the source of the data element label, an operational policy governing operation of the instance of the application with respect to the data element; and
   applying a control action to the operation associated with the data element according to the operational policy, so as to control the operation by the instance of the application with respect to the data element, wherein applying the control action to the operation according to the operational policy comprises at least one of:
   blocking operation of the instance of the application;
   controlling access by the instance of the application to the data element;
   providing instructions for managing account privileges associated with the operation; or
   dynamically monitoring operations performed by the instance of the application on the data element to identify violations of the operational policy.

2. The computer-implemented method of claim 1, wherein identifying the activity by the instance of the application comprises intercepting an attempt by the instance of the application to access the data element.

3. The computer-implemented method of claim 1, wherein obtaining the application label comprises:
   communicating with a resource associated with the instance of the application;
   receiving information about the instance of the application from the resource; and
   defining the application label based on the received information.

4. The computer-implemented method of claim 1, wherein applying the control action further comprises at least one of:
   isolating the host from accessing a network; and
   isolating the host from being accessible over the network.

5. The computer-implemented method of claim 1, wherein at least one of the source of the application or the source of the data element is determined based on a level of precedence.

6. The computer-implemented method of claim 1, wherein the data element label comprises an aggregation of information regarding a plurality of data elements.

7. The computer-implemented method of claim 1, wherein the application label comprises an aggregation of at least one of: information regarding a plurality of applications and information regarding a plurality of instances of the application.

8. The computer-implemented method of claim 1, wherein the obtaining of the application label is performed before the obtaining of the data element label.

9. The computer-implemented method of claim 1, wherein the obtaining of the application label is performed simultaneously with the obtaining of the data element label.

10. The computer-implemented method of claim 1, further comprising:
upon determining that credentials are required for performing the operation associated with the data element, obtaining based on the operational policy, corresponding credentials for performing the operation associated with the data element; and
providing the corresponding credentials to the instance of the application.

11. The computer-implemented method of claim 1, wherein:
the application label further comprises at least one of: previous operations performed by the instance of the application; previous sessions of the instance of the application; data elements previously used by the instance of the application; identification of a user permitted to use the instance of the application; identification of a group permitted to use the instance of the application; accounts associated with users of the instance of the application; accounts associated with the instance of the application; and
a communication protocol associated with the instance of the application, and
wherein the data element label further comprises at least one of: a creator of the data element; an account associated with the data element; an account that accessed the data element; a time a previous operation was performed on the data element; a type of the data element; a group including the data element; an application associated with the data element; and a communication protocol associated with the data element.

12. A system for controlling application operations on data elements, the system comprising at least one hardware processor configured to execute instructions comprising:
identifying an activity by an instance of an application running on a host to perform an operation with respect to a data element;
obtaining an application label comprising information identifying a source of the application, the source of the application comprising at least one parent process in a first hierarchy of processes associated with creation of the instance of the application;
obtaining a data element label comprising information identifying a source of the data element, the source of the data element comprising at least one parent process in a second hierarchy of processes associated with creation of the data element;
determining, based on an analysis of the source of the application and the source of the data element label, an operational policy governing operation of the instance of the application with respect to the data element; and
applying, according to the operational policy, a control action to the operation associated with the data element, so as to control the operation by the instance of the application on the data element, wherein applying the control action to the operation according to the operational policy comprises at least one of:
blocking operation of the instance of the application;
controlling access by the instance of the application to the data element;
providing instructions for managing account privileges associated with the operation; or
dynamically monitoring operations performed by the instance of the application on the data element to identify violations of the operational policy.

13. The system of claim 12, wherein identifying the activity by the instance of the application comprises intercepting an attempt by the instance of the application to access the data element.

14. The system of claim 12, wherein the instructions further comprise dynamically updating at least one of the data element label and the application label.

15. The system of claim 12, wherein the instructions further comprise labeling other data elements associated with the instance of the application.

16. The system of claim 12, wherein the system resides on one of:
the host;
an endpoint machine;
a plurality of endpoint machines;
a local server accessible via a local network;
a remote server accessible via an external network; or
at least one cloud-based resource.

17. The system of claim 12, wherein the instructions further comprise:
upon determining that credentials are required for performing the operation,
obtaining, based on the operational policy, corresponding credentials for performing the operation; and
providing the corresponding credentials to the instance of the application.

18. The system of claim 12, wherein the data element label comprises an aggregation of information regarding a plurality of data elements.

19. The system of claim 12, wherein the application label comprises an aggregation of at least one of: information regarding a plurality of applications and information regarding a plurality of instances of the application.

20. The system of claim 12, wherein the at least one processor is further adapted to execute instructions to control, according to the operational policy, at least one member from a group consisting of: subsequent operations of the instance of the application and operations of at least one other instance of the application.

* * * * *